US012668651B2

(12) United States Patent
Pehlert et al.

(10) Patent No.: US 12,668,651 B2

(45) Date of Patent: Jun. 30, 2026

(54) PROPYLENE-BASED POLYMER COMPOSITIONS HAVING A HIGH MOLECULAR WEIGHT TAIL

(71) Applicant: ExxonMobil Chemical Patents Inc., Baytown, TX (US)

(72) Inventors: George J. Pehlert, Houston, TX (US); Ranadip Ganguly, Houston, TX (US); Christopher G. Bauch, Seabrook, TX (US); Blu E. Englehorn, Houston, TX (US); Xiaodan Zhang, Houston, TX (US); Mark S. Chahl, Friendswood, TX (US); Kevin W. Lawson, Houston, TX (US); Xuejia Yan, Manvel, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 810 days.

(21) Appl. No.: 17/759,598

(22) PCT Filed: Feb. 12, 2021

(86) PCT No.: PCT/US2021/017969
§ 371 (c)(1),
(2) Date: Jul. 27, 2022

(87) PCT Pub. No.: WO2021/167850
PCT Pub. Date: Aug. 26, 2021

(65) Prior Publication Data

US 2023/0077569 A1 Mar. 16, 2023

Related U.S. Application Data

(60) Provisional application No. 62/977,427, filed on Feb. 17, 2020.

(30) Foreign Application Priority Data

Mar. 30, 2020 (EP) .................................... 20166916

(51) Int. Cl.
*C08F 210/06* (2006.01)
*C08L 23/12* (2006.01)

(52) U.S. Cl.
CPC ............ *C08F 210/06* (2013.01); *C08L 23/12* (2013.01); *C08L 2205/025* (2013.01)

(58) Field of Classification Search
CPC ...... C08F 210/06; C08F 110/06; C08F 2/001; C08F 4/651; C08F 2500/04;
(Continued)

(56) References Cited

U.S. PATENT DOCUMENTS

2013/0267667 A1* 10/2013 Paavilainen ............ C08F 10/06 526/75
2019/0276567 A1* 9/2019 Voets .................... C08F 110/06

FOREIGN PATENT DOCUMENTS

EP 0698045 A1 2/1996
EP 3309183 A1 4/2018
(Continued)

OTHER PUBLICATIONS

Written and International Search Report of corresponding PCT application No. PCT/US2021/017969 mailed Jul. 12, 2021.

*Primary Examiner* — Alicia Bland
(74) *Attorney, Agent, or Firm* — Vorys, Sater, Seymour and Pease LLP

(57) ABSTRACT

Processes for forming a polypropylene composition are provided herein comprising the steps of making a first propylene-based copolymer having a molecular weight distribution between 3 to 8.5, and making a second propylene-based polymer in the presence of the first propylene-based polymer to produce the polypropylene composition having a
(Continued)

high molecular weight tail in the amount of between 1.0 wt. % and 10.0 wt. %. The polypropylene compositions produced have a broad molecular weight distribution and high molecular weight tail to provide improved stiffness while retaining toughness.

16 Claims, 7 Drawing Sheets

(58) Field of Classification Search
CPC .............. C08F 2500/05; C08F 2500/12; C08F 2500/30; C08F 210/16; C08L 23/12; C08L 2205/025
See application file for complete search history.

(56) References Cited

FOREIGN PATENT DOCUMENTS

| | | | |
|---|---|---|---|
| WO | 2021045889 | A1 | 8/2020 |
| WO | 2021167850 | A1 | 8/2021 |

* cited by examiner

PROPYLENE-BASED POLYMER COMPOSITIONS HAVING A HIGH MOLECULAR WEIGHT TAIL

CROSS-REFERENCE OF RELATED APPLICATIONS

This application claims priority to and the benefit of U.S. Provisional Application No. 62/977,427, filed Feb. 17, 2020, and EP 20166916.5, filed Mar. 30, 2020, the disclosures of which are incorporated herein by reference.

FIELD OF THE INVENTION

The present invention is directed to methods of polymerizing polypropylene to monomers to produce polypropylene compositions having a broad molecular weight distribution and high molecular weight tail to provide improved stiffness while retaining toughness.

BACKGROUND OF THE INVENTION

Polypropylene compositions having a broad molecular weight distribution and a small concentration of a high molecular weight tail demonstrate significantly higher melt strength and improved mechanical properties, such as stiffness, through increased orientation. Polypropylene compositions having a high molecular weight tail can be produced by physical blending and/or by proprietary catalyst systems made of catalysts and electron donors.

Polypropylene compositions having a high molecular weight tail can be processed through the use of reactor cascades where polypropylenes of different molecular weights are produced in different reactors, and the polypropylene components later combined. Melt blending of polypropylene components, however, often yields poor results. Furthermore, separately producing fractions increases production costs. Moreover, to ultimately obtain a polypropylene composition having broad molecular weight distribution, insufficient homogeneity of product can result.

Moreover, polypropylene compositions having a broad molecular weight distribution and a high molecular weight tail can result in improved stiffness; however, when the molecular weight distribution is too broad, toughness can be significantly lowered due to lower entanglement density.

A need exists therefore, for processes that can form polypropylene composition having broad molecular weight distribution and high molecular weight tails where the polypropylene composition has improved stiffness and toughness/impact can be retained.

SUMMARY OF THE INVENTION

Provided herein are processes for forming a polypropylene composition comprising the steps of making a first propylene-based polymer, such as a polypropylene homopolymer, having a molecular weight distribution between 3 to 8.5, such as 6.5 to 8.5, and making a second propylene-based polymer, such as a second polypropylene homopolymer, in the presence of the first propylene-based polymer to produce the polypropylene composition having a molecular weight distribution (Mw/Mn) of at least 10 and an Mz of at least 100,000 grams/mole, such as an Mz of at least 1,000,000 grams/mole and comprising a high molecular weight tail in the amount of between 1 wt % and 10 wt %, such as 2.0 wt. % and 10.0 wt. %. In any embodiment, the molecular weight distribution of the polypropylene composition is between 13 and 15.

Further provided herein are processes for preparing a polypropylene composition with high melt strength, comprising carrying out a propylene homopolymerization reaction of two or more stages in two or more reactors connected in series. The first stage comprises the step of carrying out a polypropylene homopolymerization reaction in the presence of a catalyst system comprising a Ziegler-Natta catalyst and a first external electron donor under a polymerization temperature of between 60° C. and 80° C. to produce a first polypropylene homopolymer having a molecular weight distribution between 3 to 8.5, such as 6.5 to 8.5. The second stage comprises the step of carrying out the polypropylene homopolymerization reaction to produce a second polypropylene homopolymer in the presence of the first polypropylene homopolymer to produce the polypropylene composition having a molecular weight distribution (Mw/Mn) of at least 10 and an Mz of at least 100,000 grams/mole and comprising a high molecular weight tail in the amount of between 1 wt % and 10 wt %, such as 2.0 wt. % and 10.0 wt. %. In any embodiment, the molecular weight distribution is between 13 and 15.

Provided herein are processes for producing a polypropylene composition comprising the steps of polymerizing propylene monomers with a catalyst system and hydrogen in a slurry to produce a first polypropylene homopolymer having a molecular weight distribution (Mw/Mn) in a range of 3 to 8.5, such as 6.5 to 8.5, and polymerizing the first polypropylene in a gas phase to produce a second polypropylene homopolymer having an $M_z$ of 100 kDa or greater to produce the polypropylene composition having a molecular weight distribution of at least 10. The polypropylene composition comprising a high molecular weight tail in a range of 1 wt % to 10 wt %, such as 2 wt. % to 10 wt. % and having a melt flow rate (MFR) (230° C./2.16 kg) in a range of 0.5 g/10 min to 1000 g/10 min. In any embodiment, the polypropylene composition has a flex modulus of greater than 175 kpsi and a Notched Izod impact greater than 0.25 ft.-lbs./in. In any embodiment, the polypropylene composition has a Notched Izod impact according to ASTM D256 in a range of 0.25 ft-lbs./in. to 15 ft-lbs./in In any embodiment, the first polypropylene is made in a slurry reactor. In any embodiment, the second polypropylene is made in a gas reactor. In any embodiment, the first polypropylene homopolymer and/or the second polypropylene are made in the presence of a catalyst system. In any embodiment, the catalyst system comprises a Ziegler-Natta catalyst and an external electron donor of PTES/DCPMS. In any embodiment, the second polypropylene homopolymer is made in the presence of a different catalyst system than the first polypropylene homopolymer. In any embodiment, the catalyst system comprises two or more catalysts.

In any embodiment, the slurry phase polymerization is performed in a slurry polymerization reactor at a pressure in a range of 430 psig to 580 psig. In any embodiment, the slurry phase polymerization is performed in a slurry polymerization reactor at a temperature in a range of 60° C. to 80° C. In any embodiment, the gas phase polymerization is performed in a gas phase reactor at a pressure in a range of 150 psig to 350 psig. In any embodiment, the gas phase polymerization is performed in a gas phase reactor at a temperature in a range of 60° C. to 100° C. In any embodiment, the slurry phase polymerization is performed in a slurry polymerization reactor at a residence time in a range of 30 minutes to 120 minutes. In any embodiment, the gas phase polymerization is performed in a gas phase reactor at a residence time in a range of 30 minutes to 240 minutes.

DETAILED DESCRIPTION OF THE INVENTION

Figure 1:
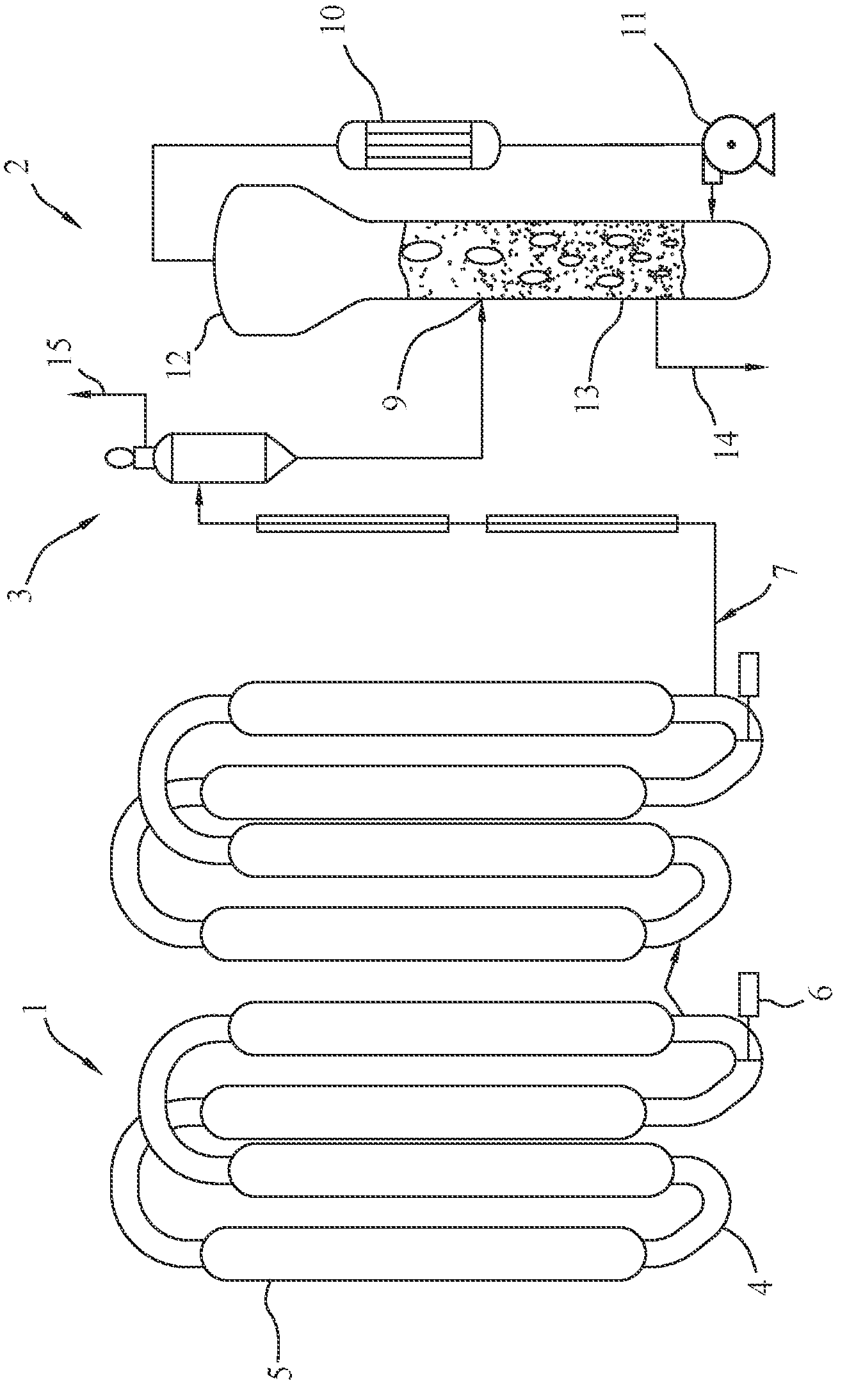
FIG. 1 is a schematic diagram of the two-stage polymerization process for producing polypropylene compositions having a high molecular weight tail.

Provided herein are new processes for producing polypropylene compositions having high molecular weight tail and broad molecular weight distribution.

For the purposes of this disclosure, the following definitions will apply:

As used herein, the terms “a” and “the” as used herein are understood to encompass the plural as well as the singular.

The term “density” refers to the density of a polymer independent of any additives, such as antiblocks, which can change the tested value. Density is measured in accordance with ASTM D-1505.

The term “melt flow rate” or “MFR” is the number of grams extruded in 10 minutes under the action of a standard load and is an inverse measure of viscosity. A high MFR implies low viscosity and low MFR implies high viscosity. In addition, polymers are shear thinning, which means that their resistance to flow decreases as the shear rate increases. This is due to molecular alignments in the direction of flow and disentanglements. As provided herein, MFR ($I_2$, 230° C., 2.16 kg) is determined according to ASTM D-1238-E, also sometimes referred to as $I_2$ or $I_{2.16}$.

As used herein, “$M_n$” is number average molecular weight, “$M_w$” is weight average molecular weight, and “$M_z$” is z-average molecular weight. Unless otherwise noted, all molecular weight units (e.g., $M_w$, $M_n$, $M_z$) including molecular weight data are in the unit of $g \cdot mol^{-1}$.

Molecular Weight Distribution (“MWD”) is equivalent to the expression $M_w/M_n$ and is also referred to as polydispersity index (PDI). The expression $M_w/M_n$ is the ratio of the $M_w$ to the $M_n$. The $M_w$ is given by $$M_w = \frac{\sum_i n_i M_i^2}{\sum_i n_i M_i}$$

the $M_n$ is given by $$M_n = \frac{\sum_i n_i M_i}{\sum_i n_i}$$

the $M_z$ is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001). The measurements proceed as follows. Gel Permeation Chromatography (Agilent PL-220), equipped with three in-line detectors, a differential refractive index detector (“DRI”), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for 2 hours. All quantities are measured gravimetrically. The TCB densities used to express the polymer concentration in mass/volume units are 1.463 g/ml at 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c=K_{DRI}I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

Unless otherwise indicated, the distribution and the moments of molecular weight ($M_w$, $M_n$, $M_w/M_n$, etc.), the comonomer content ($C_2$, $C_3$, $C_6$, etc.), and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for 1 hour for most PE samples or 2 hours for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c) at each point in the chromatogram is calculated from the baseline-subtracted IR5 broadband signal intensity (I) using the following equation: c=βI, where β is the mass constant. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, αPS=0.67 and KPS=0.000175 while a and K are for other materials as calculated and published in literature (Sun, T. et al., Macromolecules, 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk wt. % of butene comonomer, α is 0.695, and K is 0.000579*(1−0.0075*w2b) for ethylene-hexene copolymer where w2b is a bulk wt. % of hexene comonomer, and a is 0.695 and K is 0.000579*(1−0.0077*w2b) for ethylene-octene copolymer where w2b is a bulk wt. % of octene comonomer. Concentrations are expressed in g/cm$^3$, molecular weight is expressed in g/mole, and intrinsic viscosity (hence K in the Mark-Houwink equation) is expressed in dL/g unless otherwise noted.

The term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" as used herein includes all structural isomeric forms of olefins, unless it is specified to mean a single isomer or the context clearly indicates otherwise.

For example, an α-olefin monomer can refer to an α-olefin that is capable of polymerization by the insertion (Ziegler-Natta) mechanism. An α-olefin can be a compound having the structure $CH_2{=}CHR$, wherein R is a linear or cyclic alkyl group. Typical α-olefin monomers include propene (R=—$CH_3$), butene-1 (R=—$CH_2CH_3$), 4-methylpentene-1 (R=$CH_2CH(CH_3)_2$), hexene-1 (R=—$(CH_2)_3CH_3$) and octene-1 (R=—$(CH_2)_5CH_3$). In addition, an α-olefin polymer refers to an α-olefin homopolymer or copolymer. As monomers to be copolymerized can, in addition to α-olefin monomers of the above-mentioned type, also be used ethene.

The term "propylene-based polymer" as used herein refers to a polymer, such as a homopolymer, a copolymer, a terpolymer, or the like, that comprises predominantly units derived from propylene.

A "separation," "separator" or "separation step," includes a process or method of separating unreacted olefin monomer from polyolefin that has formed, for example, from a polymerization medium, such as by physical separation and/or separation by heating and/or pressure changes to the mixture, and refers to the separation of propylene from forming polypropylene, ethylene-propylene copolymer and/or the impact copolymer.

The term "polymer" refers to a polyolefin having two or more of the same or different "mer" units. A "homopolymer" is a polymer having mer units that are the same. A "copolymer" is a polymer having two or more mer units that are different from each other. A "terpolymer" is a polymer having three mer units that are different from each other.

"Different" in reference to mer units indicates that the mer units differ from each other by at least one atom or are different isomerically.

As used herein, the terms "polymerization temperature" and "reactor temperature" are interchangeable.

As used herein, the term "polypropylene" refers to homopolymers of propylene monomer (propylene-derived units).

A "reactor" is any type of vessel or containment device in any configuration of one or more reactors, and/or one or more reaction zones, wherein a similar polymer is produced; however, two or more reactors that are fluidly connected with one another can each produce a different polymer.

As used herein, the terms "slurry polymerization," "a slurry," and "in a slurry polymerization reactor" each refer to a process where an α-olefin (i.e., propylene) is partly dissolved or not dissolved in the polymerization medium. During slurry polymerization, catalyst components, solvent, α-olefins and hydrogen can be passed under pressure to one or more slurry polymerization reactors. Typically, catalyst components are fed to the slurry polymerization reactor as a mixture in aliphatic hydrocarbon solvent, in oil, a mixture thereof, or as a dry powder.

The term "gas phase polymerization reactor" refers to a gas phase reactor of the second stage of the polymerization process of the present methods where high molecular weight polyolefin is produced. The term "second gas phase polymerization reactor" refers to an optional gas phase reactor or polymerization process where comonomer and polyolefin are reacted to produce an impact copolymer.

As used herein, percent by mole is expressed as "mol. %," and percent by weight is expressed as "wt. %."

The terms "catalyst" and "catalyst compound" are defined to mean a compound capable of initiating polymerization catalysis under the appropriate conditions. A catalyst compound can be used by itself to initiate catalysis or can be used in combination with an activator, an internal electron donor, one or more external electron donors, and/or a co-catalyst to initiate catalysis.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that can be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition, two or more such hydrocarbyl radicals can together form a fused ring system, including partially or fully hydrogenated fused ring systems, which can include heterocyclic radicals.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which can also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

As used herein, unless otherwise stated, a hydrocarbyl radical can be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

As used herein, unless otherwise stated, hydrocarbyl radicals can also include isomers of saturated, partially unsaturated and aromatic cyclic structures wherein the radical can additionally be subjected to the types of substitutions described above. The term "aryl", "aryl radical", and/or "aryl group" refers to aromatic cyclic structures, which can be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

The term "non-aromatic" refers to compounds, radicals, and/or functional groups without aromatic character attributed to cyclic conjugated $sp^2$ carbons having protons with a chemical shift relative to TMS consistent with aromatic protons, or greater than 6.

As used herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The terms "functional group", "group" and "substituent" can be used interchangeably. As used herein, a functional group includes both organic and inorganic radicals or moieties comprising elements from Groups 13, 14, 15, 16, and 17 of the periodic table of elements. Suitable functional groups can include hydrocarbyl radicals, e.g., alkyl radicals, alkene radicals, aryl radicals, and/or halogen ($C_1$, Br, I, F), O, S, Se, Te, $NR^*_x$, OR*, SeR*, TeR*, $PR^*_x$, $AsR^*_x$, $SbR^*_x$, SR*, $BR^*_x$, $SiR^*_x$, $GeR^*_x$, $SnR^*_x$, $PbR^*_x$, and/or the like, wherein R is a $C_1$ to $C_{20}$ hydrocarbyl as defined above, and wherein x is the appropriate integer to provide an electron neutral moiety. Other examples of functional groups include amines, imides, amides, ethers, alcohols (hydroxides), sulfides, sulfates, phosphides, halides, phosphonates, alkoxides, esters, carboxylates, aldehydes, and the like.

As used herein, the term "high molecular weight tail" refers to a polymer fraction having a fraction of chains greater than 10^6 MW. Specifically performing gel permeation chromatography on a multimodal polypropylene composition having a high molecular weight tail will produce a plot of the molecular weight distribution showing a hump, shoulder, or tail on the right end of the distribution that represents the high molecular weight tail component of the polypropylene composition.

The term "Spheripol™ process" refers to a process for producing polypropylene typically involving catalyzed polymerization in two slurry phase loop reactors in series, followed by two or more gas phase reactors in series or in parallel.

Polypropylene compositions with a small concentration of high molecular weight tail have been demonstrated to have significantly higher melt strength as measured by Rheotens and improved mechanical properties such as stiffness through increased orientation. However, previously, polypropylene compositions with a high molecular weight tail were produced by physical blending and/or by proprietary catalyst/donor systems.

Provided herein are polypropylene composition having a high molecular weight tail which can be produced by process. Several process approaches are possible including use of the pre-polymerization loop (e.g. baby loop) or use of the gas phase reactor in the ExxonMobil or Spheripol process (1 or 2 slurry loops plus 1, 2 or 3 gas phase reactors in series). By selective control of the pre-polymerization reactor and/or gas phase reactor(s), a high molecular tail of differing concentration, co-monomer or ter-monomer composition, molecular weight, molecular weight distribution can be made resulting in a polypropylene composition having a broad molecular weight distribution and a high molecular weight tail.

More specifically, polypropylene compositions prepared according to the present processes have between 2 and 10 wt. % of a high molecular weight tail to increase melt strength and improve mechanical properties, such as increased stiffness through increased orientation of constituent polymer chains without loss of impact strength or toughness.

The present polymerization processes can include a combination of several different sequential process approaches, including, but not limited to, use of a pre-polymerization loop (e.g., baby loop), or a series of slurry loop reactors and/or gas phase reactors (e.g., 1 or 2 slurry loop reactors plus 1, 2 or 3 gas phase reactors in series). Through selective control of conditions in each reactor, certain properties of the polypropylene compositions can be controlled, including, but not limited to, the amount and molecular weight distribution of the high molecular weight tail, and the overall molecular weight and/or molecular weight distribution of the polypropylene composition together with other mechanical properties of the polypropylene composition such as flex modulus, and impact strength. For example, reactor conditions can be adjusted to make polypropylene compositions having a broad molecular weight distribution and a high molecular weight tail.

The present processes can use different external donor combinations to make a first polypropylene homopolymer having a narrow molecular weight distribution, or fewer low molecular weight chains which reduce entanglements and impact strength. More specifically, higher concentrations of low molecular weight polypropylene result in a lower Notched Izod impact strength. Polypropylene compositions produced by the present processes comprise a high molecular weight tail to increase stiffness and provide a unique combination of high stiffness together with retention of toughness and impact strength properties.

Current approaches to making propylene compositions with a high molecular weight tail typically require post-reactor blending or use of special catalyst/donor combinations. Alternatively, certain catalyst systems have been used and/or combined with other catalyst systems such as a Ziegler-Natta type catalyst having a blend of propyltriethoxylsilane (PTES) and dicyclopentylmethoxysilane (DCPMS), also referred to herein as "PTES/DCPMS") to produce impact copolymers with a high molecular tail. See, U.S. Pat. No. 6,087,459; WO 2014-070386. For these products, however, the amount high molecular weight tail decreases as the melt flow rate ("MFR") of the polypropylene composition increases (See FIGS. 4 and 5). For automotive and appliance applications, higher MFRs (e.g. >10 MFR) are generally needed to make parts via injection molding.

As described herein, multiple catalyst and donor combinations can be used in the present processes to produce polypropylene compositions having a high molecular weight tail (sometimes referred to as "HWD tail") in amount between 2 percent by weight (wt. %) to 10 wt. % where the polypropylene composition has a molecular weight distribution of between 13 and 15. The present processes can further include use of catalyst systems to produce polypropylene compositions having a broad molecular weight distribution of at least 10. In any embodiment, catalyst systems can include a combination of Ziegler Natta catalyst with PTES/DCPMS as the external electron donor.

In any embodiment, the present processes for forming polypropylene compositions can include the steps of (a) making a first polypropylene homopolymer having a molecular weight distribution between 3 to 8.5, such as 6.5 to 8.5 and (b) making a second polypropylene homopolymer in the presence of the first polypropylene homopolymer to produce the polypropylene compositions having molecular weight distribution (Mw/Mn) of at least 10 and Mz of at least 100,000 grams/mole and comprising a high molecular weight tail in the amount of between 1.0 wt % and 10. wt %, such as 2.0 wt. % and 10.0 wt. %. In any embodiment, the polypropylene composition may have a molecular weight distribution between 13 and 15.

In any embodiment, the present processes for preparing polypropylene compositions with high melt strength can include carrying out a propylene homopolymerization reaction of two or more stages in two or more reactors connected in series, wherein the first stage comprises the step of carrying out a polypropylene homopolymerization reaction in the presence of a catalyst system comprising a Ziegler-Natta catalyst and a first external electron donor under a polymerization temperature of between 60° C. and 80° C. to produce a first polypropylene homopolymer having a molecular weight distribution between 3 to 8.5, such as 6.5 to 8.5, and the second stage comprises the step of carrying out the polypropylene homopolymerization reaction to produce a second polypropylene homopolymer in the presence of the first polypropylene homopolymer to produce the polypropylene compositions having molecular weight distribution (Mw/Mn) of at least 10 and Mz of at least 100,000 grams/mole and comprising a high molecular weight tail in the amount of between 1.0 wt % and 10.0 wt %, such as 2.0 wt. % and 10.0 wt. %. In any embodiment, the external electron donor can be a blend of PTES/DCPMS (also referred to as PTES/DCPMS), MCMS, TEOS, PTES and/or TEOS/DCPMS or others.

In any embodiment, the present processes for producing polypropylene compositions can include the steps of (a) polymerizing propylene monomers with a catalyst system and hydrogen in a slurry to produce a first polypropylene homopolymer having a molecular weight distribution (Mw/Mn) in a range of 3 to 8.5, such as 6.5 to 8.5, and (b) polymerizing the first polypropylene in a gas phase to produce a second polypropylene homopolymer having an Mz of 100 kDa or greater to produce the polypropylene compositions having molecular weight distribution of at least 10, wherein the polypropylene compositions comprise a high molecular weight tail in a range of 1.0 wt % to 10.0 wt %, such as 2 wt. % to 10 wt. % and wherein the polypropylene compositions have a melt flow rate (MFR) (230° C./2.16 kg) in a range of 0.5 g/10 min to 1000 g/10 min, such as 0.5 g/10 min to 100 g/10 min.

Loss of impact (toughness) is generally due to the broadening of the molecular weight distribution and, more specifically, the lower end of the molecular weight distribution. We have discovered using the catalyst approach (e.g. Ziegler-Natta type catalyst succinate), we can broaden on both ends of the molecular weight distribution, low molecular weight and high molecular weight chains. However, this is not always desirable because shorter chains lower entanglement density. In the present disclosure, longer chains are only added to the composition. Resulting in a higher entanglement density without the detriment of adding lower molecular weight chains.

Prepolymerization

In any embodiment, prepolymerization can be continuous where a liquid phase includes propylene monomer together with minor amounts of other reactants and optionally inert components dissolved therein. In any embodiment, prepolymerization can be performed in a continuous stirred tank reactor or a loop reactor. A prepolymerization reaction can be conducted at a temperature of 0 to 60° C., from 10 to 50° C., or from 20 to 45° C. Pressure of the prepolymerization reaction is not critical, but must maintain the reaction mixture in liquid phase, such as from 275 to 1435 psig, or 420 to 1000 bar.

In a prepolymerization step, propylene monomers can be fed into a prepolymerization stage. The amount of prepolymer (propylene monomer) on a catalyst can be from 10 to 1000 g per g of the solid catalyst component, or from 50 to 500 g per g of the solid catalyst component. Catalyst particles can be recovered from a continuous stirred prepolymerization reactor, but cannot all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles can contain an amount of prepolymer which is outside the above limits.

The catalyst system can be introduced in the prepolymerization step. In any embodiment, a solid catalyst component and co-catalyst can be fed separately. For example, a portion of cocatalyst can be introduced into the prepolymerization stage and a second portion can be fed into subsequent polymerization stages. Other components can be added in the prepolymerization stage, such as chain transfer agents, antistatic agents, promoters, scavenging agents, and the like.

Catalyst System

Catalyst systems in accordance with the present disclosure can include at least one catalyst, at least one internal electron donor, one or more external electron donors, a co-catalyst, and/or a support where the catalyst system can polymerize propylene monomers to produce a propylene composition under polymerization conditions of suitable temperature and pressure.

In any embodiment, catalyst systems can include Ziegler-Natta catalysts such as solid titanium supported catalyst systems described in U.S. Pat. Nos. 4,990,479 and 5,159,021, and PCT Publication No. WO 00/63261, and others. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium hydrocarbon composition with a titanium halide and with a diester of an aromatic dicarboxylic acid; and (3) contacting the resulting functionalized dialkoxy magnesium-hydrocarbon composition of step (2) with additional titanium halide.

A solid titanium catalyst component can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein "R" is a hydrocarbyl radical, "X" is a halogen atom, and "n" is from 0 to 4. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{21}$ radicals, any of which can be linear, branched, or cyclic where appropriate (aromatic or non-aromatic).

In any embodiment, suitable titanium compounds for use herein include: titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(OC\ n\text{-}C_4H_9)Cl_3$, $Ti(OC_2H_5)Br_3$, and/or $Ti(O\ iso\text{-}C_4H_9)Br_3$; dialkoxytitanium dihalides including $Ti(OCH_3)_2Cl_2$, $Ti(OC_2H_5)_2Cl_2$, $Ti(O\ n\text{-}C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O\ n\text{-}C_4H_9)_3Cl$ and/or $Ti(OC_2H_5)_3Br$; and/or tetraalkoxy titaniums including $Ti(OCH_3)_4$, $Ti(OC_2H_5)_4$, and/or $Ti(O\ n\text{-}C_4H_9)_4$.

In any embodiment, the halogen-containing titanium compound can be a titanium tetrahalide, or titanium tetrachloride. The titanium compounds can be used singly or in combination with each other. The titanium compound can be diluted with a hydrocarbon compound or a halogenated hydrocarbon compound.

In any embodiment, the magnesium compound used in the preparation of the solid titanium catalyst component can include a magnesium compound having reducibility (or capable of alkyl substitution) and/or a magnesium compound having no reducibility. Suitable magnesium compounds having reducibility can, for example, be magnesium compounds to having a magnesium-carbon bond or a magnesium-hydrogen bond. Examples of useful magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds can be used singly or they can form complexes with the organoaluminum co-catalyst as described herein. These magnesium compounds can be a liquid or a solid. In combination with the magnesium compound, the titanium-based Ziegler-Natta catalyst is said to be supported, thus the solid part of the catalyst.

Suitable examples of the magnesium compounds having no reducibility include: magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

In any embodiment, non-reducible magnesium compounds can be compounds derived from the magnesium compounds having reducibility, or can be compounds derived at the time of preparing the catalyst component. The magnesium compounds having no reducibility can be derived from the compounds having reducibility by, for example, contacting the magnesium compounds having reducibility with polysiloxane compounds, halogen-containing silane compounds, halogen-containing aluminum compounds, esters, alcohols, and the like.

In any embodiment, the magnesium compounds having reducibility and/or the magnesium compounds having no reducibility can be complexes of the above magnesium compounds with other metals, or mixtures thereof with other metal compounds. They can also be mixtures of two or more types of the above compounds. In any embodiment, halogen-containing magnesium compounds, including magnesium chloride, alkoxy magnesium chlorides and aryloxy magnesium chlorides can be used.

In any embodiment, a suitable solid catalyst component comprising a non-aromatic internal electron donor can be a catalyst solid. Such a catalyst is used to exemplify the invention, other titanium supported catalyst systems are contemplated. Other catalyst use mechanisms include, but are not limited to, batch prepolymerization, in situ prepolymerization and other such mechanisms.

Activator

In any embodiment, the catalyst systems comprise the Ziegler-Natta catalysts used in combination with an activator, also referred to herein as a Ziegler-Natta activator. In any embodiment, compounds containing at least one aluminum-carbon bond in the molecule can be utilized as the activators, also referred to herein as an organoaluminum activator or an organoaluminum compound. Suitable organoaluminum compounds include organoaluminum compounds of the general formula $R^1_mAl(OR^2)_nH_pX_q$, wherein $R^1$ and $R^2$ are identical or different, and each represents a $C_1$ to $C_{15}$ hydrocarbyl radical (alkyl or aryl), a $C_1$ to $C_4$ alkyl; "X" represents a halogen atom; and "m" is 1, 2, or 3; "n" is 0, 1, or 2; "p" is 0, 1, 2, or 3; and "q" is 0, 1, or 2; and wherein m+n+p+q=3.

Other suitable organoaluminum compounds include complex alkylated compounds of aluminum represented by the general formula $M^1AlR^1_4$, wherein $M^1$ is lithium, sodium, or potassium, and $R^1$ is as defined above. Suitable organoaluminum compounds include compounds represented by the following general formula $R^1_mAl(OR^2)_{3-m}$, wherein $R^1$ and $R^2$ are as defined above, and m is preferably $1.5 \leq m \leq 3$; $R^1_mAl(H)_{3-m}$, wherein $R^1$ is as defined above, X is halogen, and m is $0 \leq m \leq 3$, or $2 \leq m \leq 3$; and/or $R^1_mAl(OR^2)_nX_q$, wherein $R^1$ and $R^2$ are as defined above, X is halogen, $0 \leq m \leq 3$, $0 \leq n \leq 3$, $0 \leq q \leq 3$, and m+n+q=3.

Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesquibutoxide; partially alkoxylated alkyl aluminums having an average composition represented by the general formula $R^1_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide.

In any embodiment, the organoaluminum compound can comprise two or more aluminum atoms bonded through an oxygen or nitrogen atom. Examples include $(C_2H_5)_2AlOAl(C_2H_5)_2$, $(C_4H_9)_2AlOAl(C_4H_9)_2$, and/or methylaluminoxane (MAO). Other suitable examples include $LiAl(C_2H_5)_4$ and $LiAl(C_2H_{15})_4$. In any embodiment, the trialkyl aluminums and alkyl-aluminums resulting from bonding of at least two aluminum compounds can be used.

In any embodiment, the activator can be an organoaluminum compound that is halogen free. Suitable halogen free organoaluminum compounds are in particular, branched unsubstituted alkylaluminum compounds of the formula $AlR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as an activator are readily available and amply disclosed in the prior art including U.S. Pat. No. 4,990,477. In any embodiment, the organoaluminum Ziegler-Natta activator can be trimethyl aluminum, triethylaluminum (TEAL), or a combination thereof.

Internal Electron Donors

Electron donors are present with the metal components described above in forming the catalyst system suitable for producing the polypropylene compositions described herein. Both "internal" and "external" electron donors are desirable for forming the catalyst system suitable for making the polypropylene compositions described herein. Internal and external-type electron donors are described, for example, in U.S. Pat. No. 4,535,068.

The internal electron donor can be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids, any of which can include an aromatic group. The internal electron donors are typically part of the solid catalyst component, while the external electron donors are typically added separately from the solid catalyst component.

In any embodiment, an internal electron donor can be used in the formation reaction of the catalyst as the transition metal halide is reacted with the metal hydride or metal alkyl. Examples of suitable internal electron donors include amines, amides, ethers, esters, esters, ketones, nitriles, phosphines, stilbenes, arsines, phosphoramides, thioethers, thioesters, aldehydes, alcoholates, and salts of organic acids. In any embodiment, the internal donor can be non-aromatic. In any embodiment, the non-aromatic internal electron donor can comprise an aliphatic amine, amide, ester, ether, ketone, nitrile, phosphine, phosphoramide, thioethers, thioester, aldehyde, alcoholate, carboxylic acid, or a combination thereof.

In any embodiment, the solid titanium catalyst component can be prepared using a to non-aromatic internal electron donor. Examples of suitable non-aromatic internal electron donors include oxygen-containing electron donors such as alcohols, ketones, aldehydes, carboxylic acids, esters of organic or inorganic oxides, ethers, acid amides and acid anhydrides; nitrogen-containing electron donors such as ammonia, amines, nitriles, and/or isocyanates. Suitable examples include alcohols having 1 to 18 carbon atoms such as methanol, ethanol, propanol, pentanol, hexanol, octanol, 2-ethylhexanol, dodecanol, octadecyl alcohol, and the like; ketones having 3 to 15 carbon atoms such as acetone, methyl ethyl ketone, methyl isobutyl ketone, and the like; aldehydes having 2 to 15 carbon atoms such as acetaldehyde, propionaldehyde, octylaldehyde, and the like; organic acid esters having 2 to 30 carbon atoms including the esters desired to be included in the titanium catalyst component, such as methyl formate, ethyl formate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethylcyclohexanecarboxylate, diethyl 1,2-cyclohexanedicarboxylate, di(2-ethylhexyl)1,2-cyclohexanedicarboxylate, gamma-butyrolactone, delta-valerolactone, and/or ethylene carbonate; inorganic acid esters such as ethyl silicate and butyl silicate; acid halides having 2 to 15 carbon atoms such as acetyl chloride and the like; ethers having 2 to 20 carbon atoms, such as methyl ether, ethyl ether, isopropyl ether, butyl ether, amyl ether, tetrahydrofuran and the like; acid amides such as acetamide, and the like; acid anhydrides such as acetic anhydride, and the like; amines such as methylamine, ethyl-amine, triethylamine, tributylamine, tetramethyl-ethylenediamine, and the like; and nitriles such as acetonitrile, trinitrile, and the like.

In any embodiment, the non-aromatic internal electron donor comprises a $C_1$ to $C_{20}$ diester of a substituted or unsubstituted $C_2$ to $C_{10}$ dicarboxylic acid. In any embodiment, the non-aromatic internal electron donor can be a succinate according to Formula I:

(I)

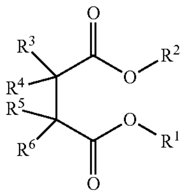

wherein $R^1$ and $R^2$ are independently $C_1$ to $C_{20}$ linear or branched alkyl, alkenyl, or cycloalkyl hydrocarbyl radicals; $R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

In any embodiment, $R^3$ to $R^5$ of Formula I can be hydrogen and $R^6$ can be a radical selected from the group consistent of a primary branched, secondary or tertiary alkyl, or cycloalkyl radical having from 3 to 20 carbon atoms.

In any embodiment, the internal donor can be a monosubstituted non-aromatic succinate compound. Suitable examples include diethyl secbutylsuccinate, diethylhexylsuccinate, diethyl cyclopropylsuccinate, diethyl trimethylsilylsuccinate, diethyl methoxysuccinate, diethyl cyclohexylsuccinate, diethyl(cyclohexylmethyl)succinate, diethyl t-butylsuccinate, diethyl isobutylsuccinate, diethyl isopropylsuccinate, diethyl neopentylsuccinate, diethyl isopentylsuccinate, diethyl(1,1,1trifluoro-2-propyl)succinate, diisobutyl sec-butylsuccinate, diisobutylhexylsuccinate, diisobutyl cyclopropylsuccinate, diisobutyl trimethylsilylsuccinate, diisobutyl methoxysuccinate, diisobutyl cyclohexylsuccinate, diisobutyl(cyclohexylmethyl)succinate, diisobutyl t-butylsuccinate, diisobutyl isobutylsuccinate, diisobutyl isopropylsuccinate, diisobutyl neopentylsuccinate, diisobutyl isopentylsuccinate, diisobutyl(1,1,1-trifluoro-2-propyl)succinate, dineopentyl sec-butylsuccinate, dineopentyl hexylsuccinate, dineopentyl cyclopropylsuccinate, dineopentyl trimethylsilylsuccinate, dineopentyl methoxysuccinate, dineopentyl cyclohexylsuccinate, dineopentyl(cyclohexylmethyl)succinate, dineopentyl tbutylsuccinate, dineopentyl isobutylsuccinate, dineopentyl isopropylsuccinate, dineopentyl neopentylsuccinate, dineopentyl isopentylsuccinate, and/or dineopentyl(1, 1,1-trifluoro-2propyl)succinate.

In any embodiment, the internal electron donor having a structure consistent with Formula I comprises at least two radicals from $R^3$ to $R^6$, which are different from hydrogen and are selected from $C_1$ to $C_{20}$ linear or branched alkyl, alkenyl, and/or cycloalkyl hydrocarbyl groups, which can contain heteroatoms. In any embodiment, two radicals different from hydrogen can be linked to the same carbon atom. Suitable examples include 2,2-disubstituted succinates including diethyl 2,2-dimethylsuccinate, diethyl 2-ethyl-2-methylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl methylsuccinate, diethyl 2,2-diisopropyl diethyl 2isobutyl-2-ethylsuccinate, diethyl 2-(1,1,1-trifluoro-2-propyl)-2-methylsuccinate, diethyl 2 isopentyl-2-isobutylsuccinate, diisobutyl 2,2dimethylsuccinate, diisobutyl 2-ethyl-2-methylsuccinate, diisobutyl 2-(cyclohexylmethyl)-2-isobutylsuccinate, diisobutyl 2-cyclopentyl-2-n-propylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-isobutyl-2-ethylsuccinate, diisobutyl 2-(1,1,1-trifluoro-2-propyl)-2-methylsuccinate, diisobutyl 2-isopentyl-2-isobutylsuccinate, diisobutyl 2,2-diisopropylsuccinate, dineopentyl 2,2-dimethylsuccinate, dineopentyl 2-ethyl-2-methylsuccinate, dineopentyl 2-(cyclohexylmethyl)-2isobutylsuccinate, dineopentyl 2-cyclopentyl-2-n-propylsuccinate, dineopentyl 2,2-diisobutylsuccinate, dineopentyl 2-cyclohexyl-2-ethylsuccinate, dineopentyl 2-isopropyl-2methylsuccinate, dineopentyl 2-isobutyl-2-ethylsuccinate, dineopentyl 2-(1,1,1-trifluoro-2-propyl)-2-methylsuccinate, dineopentyl 2,2-diisopropylsuccinate, and/or dineopentyl 2-isopentyl-2isobutylsuccinate.

In any embodiment, at least two radicals different from hydrogen can be linked to different carbon atoms between $R^3$ and $R^6$. Examples include $R^3$ and $R^5$ or $R^4$ and $R^6$. Suitable non-aromatic succinate compounds include: diethyl 2,3-bis(trimethylsilyl)succinate, diethyl 2,2-secbutyl-3-methylsuccinate, diethyl 2-(3,3,3-trifluoropropyl)-3-methylsuccinate, diethyl 2,3bis(2-ethylbutyl)succinate, diethyl 2,3-diethyl-2-isopropylsuccinate, diethyl 2,3-diisopropyl-2methylsuccinate, diethyl 2,3-dicyclohexyl-2-methylsuccinate, diethyl 2,3-diisopropylsuccinate, diethyl 2,3-bis(cyclohexylmethyl)succinate, diethyl 2,3-di-tbutylsuccinate, diethyl 2,3-diisobutylsuccinate, diethyl 2,3-dineopentylsuccinate, diethyl 2,3 diisopentylsuccinate, diethyl 2,3-(1-trifluoromethyl-ethyl)succinate, diethyl 2-isopropyl-3-isobutylsuccinate, diethyl 2-t-butyl-3isopropylsuccinate, diethyl 2-isopropyl-3-cyclohexylsuccinate, diethyl 2-isopentyl-3cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl) succinate, diisobutyl 2,3-diethyl-2 isopropylsuccinate, diisobutyl 2,3-diisopropyl-2-methylsuccinate, diisobutyl 2,3-dicyclohexyl2-methylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3diisopentylsuccinate, diisobutyl 2,3-(1,1,1-trifluoro-2-propyl)succinate, diisobutyl 2,3-n-propylsuccinate, diisobutyl 2-isopropyl-3ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3bis(trimethylsilyl)succinate, dineopentyl 2,2-di-sec-butyl-3-methylsuccinate, dineopentyl 2(3,3,3-trifluoropropyl)-3-methylsuccinate, dineopentyl 2,3 bis(2-ethylbutyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3 dineopentylsuccinate, dineopentyl 2,3-diisopentylsuccinate, dineopentyl 2,3-(1,1,1-trifluoro-2propyl)succinate, dineopentyl 2,3-n-propylsuccinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3 cyclohexylsuccinate, dineopentyl 2-n-propyl-3-(cyclohexylmethyl)succinate, dineopentyl 2 cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, and/or dineopentyl 2,3-diethyl 2,3-diisopropylsuccinate.

In any embodiment, the compounds according to Formula I can include two or four of the radicals $R^3$ to $R^6$joined to the same carbon atom which are linked together to form a cyclic multivalent radical. Examples of suitable compounds include 1-(ethoxycarbonyl)-1-(ethoxyacetyl)-2,6-dimethylcyclohexane, 1-(ethoxycarbonyl)-1-(ethoxyacetyl)-2,5-dimethyl-cyclopentane, 1-(ethoxycarbonyl)-1-(ethoxyacetylmethyl)-2-methylcyclohexane, and/or 1-(ethoxycarbonyl)-1-(ethoxy(cyclohexyl)acetyl)cyclohexane.

For purposes herein, all the above-mentioned compounds can be used either in the form of pure stereoisomers or in the form of mixtures of enantiomers, or mixture of diastereoisomers and enantiomers. When a pure isomer is to be used it can be isolated using the common techniques known in the art. In particular, some of the succinates of the present invention can be used as a pure rac or meso forms, or as mixtures thereof, respectively.

In any embodiment, the internal electron donor compound can be selected from the group of diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, diisobutyl 2-(cyclohexylmethyl) ethyl-3-methylsuccinate, and combinations thereof.

External Electron Donors

In any embodiment, in conjunction with an internal donor, two or more external electron donors can also be used in combination with the catalyst in the catalyst system. External electron donors include, but are not limited to, organic silicon compounds, e.g., tetraethoxysilane (TEOS), methylcyclohexyldimethoxysilane (MCMS), propyltriethoxysilane (PTES) and dicyclopentydimethoxysilane (DCPMS). For example, in any embodiment, the external electron donor can be PTES/DCPMS, metal chelate monomers ("MCMS"), tetraethoxysilane ("TEOS"), propyltriethoxysilane ("PTES") and/or a blend of tetraethoxysilane and DCPMS (also referred to as "TEOS)/DCPMS") and/or others.

The use of organic silicon compounds as external electron donors is described, for example, in U.S. Pat. Nos. 4,218,339; 4,395,360; 4,328,122; and U.S. Pat. No. 4,473,660. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereo-regulating capability and hydrogen response of a given external electron donor are directly and inversely related. The DCPMS donor has a substantially lower hydrogen response than the PTES donor, but produces a significantly higher level of stereoregularity than PTES.

In any embodiment, the two external electron donors A and B, also referred to herein as the first external electron donor and the second external electron donor, can be selected such that the melt flow rate MFR (A) of polypropylene compositions obtained by homopolymerizing propylene by using the first external electron donor (A) in combination with the solid titanium catalyst component and the organoaluminum compound catalyst component and the MFR (B) of polypropylene compositions obtained by homopolymerizing propylene by using the second external electron donor (B) under the same conditions as in the case of using the external electron donor (A) have the following relation: $1.2 \leq \log [MFR(B)/MFR(A)] \leq 1.4$.

The external electron donors to be used in the preparation of the electron donor catalyst component can be those electron donors which are used in preparing the solid titanium catalyst component. In any embodiment, each of the external electron donors (A) and (B) can comprise organic silicon compounds.

In any embodiment, one or more of the external electron donors can comprise an organic silicon compound of formula: $R^3{}_nSi(OR^4)_{4-n}$, wherein $R^3$ and $R^4$ independently represent a hydrocarbyl radical and $0<n<4$.

Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxy-silane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyltriethoxysilane, decyltrimethoxysilane, decyltriethoxy-silane, phenyltrimethoxysilane, [gamma]-chloropropyltrimethoxysilane, methyltriethoxysilane, ethyltriethoxy-silane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxy-silane, ethyl silicate, butyl silicate, trimethyl-phenoxysilane, methylallyloxysane, vinyltris (beta-methoxyethoxysilane), vinyltriacetoxysilane, and/or dimethyltetraethoxydisiloxane.

In any embodiment, one of the two or more organic silicon compounds can comprise the formula: $R^1{}_2Si(OR^2)_2$, wherein $R^1$ represents a hydrocarbyl radical in which the carbon adjacent to Si is secondary or tertiary. Suitable examples include substituted and unsubstituted alkyl groups such as isopropyl, sec-butyl, t-butyl and t-amyl groups, cyclo-alkyl groups such as cyclopentyl and cyclohexyl groups, cycloalkenyl groups such as a cyclopentenyl group, and aryl groups such as phenyl and tolyl groups. In any embodiment, $R^2$ can represent a hydrocarbyl radical, or a hydrocarbyl radical having 1 to 5 carbon atoms, or a hydrocarbyl radical having 1 or 2 carbon atoms.

Examples of suitable organic silicon compounds include diisopropyldimethoxysilane, diisopropyldiethoxysilane, di-sec-butyldimethoxysilane, di-t-butyldimethoxysilane, di-t-amyldimethoxysilane, dicyclopentyldimethoxysilane, dicyclohexyldimethoxy-silane, diphenyldimethoxysilane, bis-o-tolyldimethoxy-silane, bis-m-tolyldimethoxysilane, bis-p-tolyldi-methoxysilane, and/or bis-ethylphenyldimethoxysilane.

In any embodiment, the organic silicon compound can be represented by the following general formula: $R^1{}_nSi(OR^2)_{4-n}$, wherein n is 2, $R^1$ each represents a hydrocarbyl radical and at least one of the two hydrocarbyl radicals is a hydrocarbon group in which the carbon adjacent to Si is a primary carbon. Examples of suitable hydrocarbon groups include alkyl groups such as ethyl, n-propyl and n-butyl groups, aralkyl groups such as cumyl and benzyl groups, and alkenyl groups such as a vinyl group, and the like.

In any embodiment, $R^2$ can represent a hydrocarbyl radical preferably having 1 to 5 carbon atoms, or from 1 to 2 carbon atoms. Suitable examples of the organic silicon compounds to in which n is 2 include diethyldimethoxysilane, dipropyldimethoxysilane, di-n-butyldimethoxysilane, dibenzyldimethoxysilane, and/or divinyldimethoxysilane.

Examples of suitable compounds when $0<n<2$ or $2<n<4$ include $R^1$ being an alkyl, cycloalkyl, alkenyl, aryl or aralkyl group and $R^2$ represents a hydrocarbyl radical having 1 to 5 carbon atoms, or 1 to 2 carbon atoms.

Suitable examples of the organic silicon compounds in which $0<n<2$ or $2<n<4$ include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxysilane, cyclohexylmethyldi-ethoxysilane, ethyltrimethoxysilane, ethyltriethoxy-silane, vinyltriethoxysilane, methyltrimethoxysilane, methyltriethoxysilane, propyltrimethoxysilane, decyl-trimethoxysilane, decyltriethoxysilane, phenyltrimethoxysilane, propyltriethoxysilane, butyltriethoxy-silane, phenyltriethoxysilane, vinyltrimethoxysilane, vinyltributoxysilane, cyclohexyltrimethoxysilane, 2-norbomanetrimethoxysilane, and/or 2-norbornanetriethoxy-silane.

In any embodiment the external electron donors include methyltrimethoxysilane, ethyltrimethoxysilane, ethyltriethoxysilane, vinyltriethoxysilane, propyltrimethoxysilane, decyl-trimethoxysilane, decyltriethoxysilane, propyltriethoxysilane, butyltriethoxysilane, phenyltriethoxy-silane, vinyltrimethoxysilane, vinyltributoxysilane and/or cyclohexyltrimethoxysilane.

In any embodiment, the above disclosed organic silicon compounds can be used such that a compound capable of being changed into such an organic silicon compound is added at the time of polymerizing or preliminarily polymerizing an olefin, and the organic silicon compound can be formed in situ during the polymerization or the preliminary polymerization of the olefin.

In any embodiment, a first external electron donor can have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, each $R^2$ is independently a hydrocarbyl radical comprising from 1 to 10 carbon atoms, and a second external electron donor having the formula $R^3{}_nSi(OR^4)_{4-n}$, wherein each $R^3$ and $R^4$ are independently a hydrocarbyl radical comprising from 1 to 10 carbon atoms, and n is 1, 2, or 3, and the second external electron donor is different than the first external electron donor.

In any embodiment, the first external electron donor and the second external electron donor selected from the group of tetraethoxysilane, methylcyclohexyldimethoxysilane, propyltriethoxysilane, dicyclopentydimethoxysilane, and combinations thereof. In any embodiment, the Ziegler-Natta catalyst system can comprise 2.5 mol % to less than 50 mol % of the first external electron donor and greater than 50 mol % of a second external electron donor based on total mol % of external electron donors. In any embodiment, the first electron donor can comprise dicyclopentyldimethoxysilane ("DCPMS") and the second external electron donor can comprise propyltriethoxysilane ("PTES").

In any embodiment, a relationship between the first external electron donor and the second external electron donor can be defined by the equation: $1.2 \leq \log [MFR(B)/MFR(A)] \leq 1.4$, wherein MFR(A) is a first melt flow rate of a homopolymer formed by polymerizing propylene monomers in the presence of the Ziegler-Natta catalyst and the first external electron donor, and wherein MFR(B) is a second melt flow rate of a homopolymer formed by polymerizing propylene monomers in the presence of the Ziegler-Natta catalyst and the second external electron donor, and wherein the MFR(A) is lower than the MFR(B).

In any embodiment, at least one, or two or more external electron donors are used in combination with the solid Ziegler-Natta catalyst component, as long as one of them is an amino-silane donor. External donors can be added to the polymerization reactors as a separate component along with the catalyst and activator. As used herein, an "amino-silane" donor is an external electron donor having at least one amine or alkylamine moiety and at least one silane, alkylsilane or siloxane moiety. In any embodiment, the external electron donors can include an organic silicon compound of the general formula $R^1_4Si$ and/or $R^1_nSi(NR^2_2)_{4-n}$, wherein each $R^1$ is independently selected from hydrogen, $C_1$ to $C_{10}$ linear and branched alkyls and alkenes, $C_4$ to $C_{12}$ cycloalkyls and cycloalkenes, $C_5$ to $C_{14}$ aryls, $C_6$ to $C_{20}$ alkylaryls, $C_1$ to $C_{10}$ linear or branched alkoxys, $C_4$ to $C_{12}$ cycloalkoxys, $C_5$ to $C_{14}$ aryloxys, and $C_6$ to $C_{20}$ alkylaryloxys; each $R^1$ is independently selected from $C_1$ to $C_6$ linear, branched and cyclic alkyls or alkoxys; and each $R^2$ is independently selected from hydrogen, $C_1$ to $C_{10}$ linear and branched alkyls and alkenes, $C_4$ to $C_{12}$ cycloalkyls and cycloalkenes, $C_5$ to $C_{14}$ aryls, and $C_6$ to $C_{20}$ alkylaryls; each $R^2$ is independently selected from $C_1$ to $C_5$ linear or branched alkyls; and wherein "n" is 0, 1, 2, or 3.

Examples of the suitable organic silicon and/or amino-silane compounds include dimethylamino-triethoxysilane, diethylamino-triethoxysilane, vinyl ethyl amino-triethoxysilane, dipropylamino-triethoxysilane, dimethylamino-trimethoxysilane, dimethylamino-tripropylsilane, diethylamino-dicyclopentylmethoxysilane, diethylamino-dimethoxy-cyclohexylsilane, dipropylamino-vinyldimethoxysilane, trimethylmethoxysilane, trimethylethoxysilane, dimethyldimethoxysilane, dimethyl-dimethoxysilane, dimethyldiethoxysilane, diisopropyldiethoxysilane, t-butylmethyl-n-diethoxysilane, t-butyl methyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, vinyltributoxysilane, cyclohexyltrimethoxysilane, cyclohexyltriethoxysilane, 2-norbornanetriethoxysilane, 2-norbornanemethyldimethoxysilane, ethylsilicate, butylsilicate, trimethylphenoxysilane, methylallyloxysilane, vinyltris(β-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

In any embodiment, the external electron donor can contain one or more amino-silane donors. Different external electron donors can be added in the first and/or second or more loop reactors to effect the polypropylene properties such as making the polypropylene bimodal in MFR, molecular weight, crystallinity, or some other property. In an aspect, one external electron donor is added throughout, and at the same concentration. In any embodiment, the combined concentration of external electron donors can be present with the catalyst and olefin monomer(s) in the reactor between 5 ppm, 10 ppm, 20 ppm to 80, 100, and 120 ppm, based on the total olefin concentration.

In any embodiment, the concentration of the Ziegler-Natta catalyst in the polymerization system can be 2 ppm, 4 ppm, 8 ppm to 20 ppm, 40 ppm, 60 ppm, and 100 ppm based on the total polypropylene concentration. In any embodiment, the organoaluminum activator can be present in an amount sufficient to produce between 0.1 to 500 g, and between 0.3 to 300 g of polypropylene per gram of the titanium catalyst present, and can present between 0.1 to 100 moles, and from 0.5 to 50 moles, per mole of the titanium atom present in the catalyst component. Stated another way, the organoaluminum activator can be added in the amount of 10 ppm, 20 ppm, 40 ppm to 80 ppm, 100 ppm, 140 ppm, 180 ppm and 200 ppm based on the total polypropylene concentration.

Polymerization Methods

Polymerization methods can include sequential polymerization processes in which one or more polymerization reactors are configured in series. Following each polymerization, the product mixture is transferred to the next reactor in series (or reaction stage containing multiple reactors) until the polypropylene composition is obtained. Sequential polymerization processes in accordance with the present disclosure can include one or more reactor types operated in sequence, such as one or more slurry (or liquid) phase polymerization reactors, including stirred tank reactors, loop reactors, and the like, and one or more gas phase polymerization reactors. For example, sequential polymerization processes can include a pre-polymerization loop and/or one or more gas phase reactors, or one or more tubular loop reactors operated in series with one or more gas phase reactors to produce a polypropylene composition. Sequential polymerization techniques can include commercial processes such as LyondellBassell's Spheripol™ process or ExxonMobil's sequential polyolefin polymerization.

Slurry Polymerization Reactors

The present methods include a first stage of carrying out a polypropylene homopolymerization reaction in the presence of a catalyst system comprising a Ziegler-Natta catalyst and a first external electron donor under a polymerization temperature of between 60° C. and 80° C. to produce a first polypropylene homopolymer having a molecular weight distribution between 6.5 to 8.5. In a slurry, propylene monomers are polymerized to produce polypropylene. In the slurry polymerization reactor, polypropylene particles are formed and suspended in propylene monomer as well as a catalyst system that is fragmented and dispersed within the polyolefin particles. During slurry polymerization, the slurry is agitated to enable the transfer of reactants from the polymerization medium into the polypropylene particles.

Slurry polymerization is referred to sometimes as "bulk polymerization," or a "bulk slurry." Slurry polymerization is conducted in liquid propylene monomer with or without an inert diluent. In any embodiment, propylene monomers used in commercial production can contain some fraction of aliphatic hydrocarbons as impurities. For example, the propylene monomer can contain up to 5% of propane as an impurity. The propylene monomer is polymerized in the slurry polymerization reactor. Unreacted propylene monomer can be recycled from the effluent of the slurry polymerization reactor and recycled. Further, inert components can accumulate during slurry polymerization. Therefore, the effluent of the slurry polymerization reactor can comprise up to 40 wt. % of inert components. It is to be understood, however, that such a process is still within the meaning of "slurry polymerization."

In present methods, the temperature of the slurry can be between 60° C. to 80° C., 62° C. to 78° C., or 65° C. to 75° C. and the pressure of the slurry polymerization reactor is typically between 430 psig to 580 psig, 450 psig to 570 psig, or 480 psig to 560 psig. In some cases, slurry polymerization can be performed at a temperature which is higher than the critical temperature of the polymerization medium. Such reaction conditions are often referred to as "supercritical conditions." The phrase "supercritical fluid" is used to denote a fluid or fluid mixture at a temperature and pressure exceeding the critical temperature and pressure of said fluid or fluid mixture.

The slurry polymerization reactor can be any known reactor used for polymerization of propylene monomer. The slurry polymerization reactor can be a continuous stirred tank reactor, a loop reactor, or the like. In any embodiment, slurry polymerization can be performed in a loop reactor in which a slurry is circulated with high velocity along a closed pipe by a circulation pump. Examples of loop reactors include U.S. Pat. Nos. 4,582,816, 3,405,109, 3,324,093, EP 479186, and U.S. Pat. No. 5,391,654.

As described herein, a slurry can be withdrawn from the reactor either continuously or intermittently. Intermittent withdrawal can include the use of settling legs where the solids concentration of the slurry is allowed to increase before withdrawing a batch of the concentrated slurry from the reactor. The use of settling legs is disclosed in, for example, U.S. Pat. Nos. 3,374,211, 3,242,150, and EP 1310295. Continuous withdrawal is disclosed in, for example, EP 891990, EP 1415999, EP 1591460, and EP 1860125. In any embodiment, continuous withdrawal methods can be combined with a suitable concentration method, such as those disclosed in EP 1860125 and EP 1591460.

In the present methods, hydrogen is used in the slurry polymerization reactor as a chain transfer agent to control the molecular weight and melt flow rate of the polypropylene. Furthermore, hydrogen feed into the slurry polymerization reactor is adjusted to achieve a target melt flow rate of the polypropylene compositions. In addition, other process additives can also be introduced into the slurry polymerization reactor to facilitate a stable operation of the process such as chain transfer agents, antistatic agents, antifouling agents, scavengers, and the like.

In any embodiment, the present methods include two step or two stage polymerization. The first step or first stage includes slurry phase polymerization in the slurry polymerization reactor. The second step or second stage includes gas phase polymerization in a gas phase polymerization reactor. Two stage polymerization can be referred to as sequential polymerization. Here, slurry phase polymerization of propylene monomer is continued in a gas phase polymerization (in a gas phase polymerization reactor as described immediately below). More specifically, in the present methods, the effluent from the slurry polymerization reactor comprising polyolefin is fed to the gas phase polymerization reactor directly without a flash step between reactors. Other processes utilizing sequential polymerization are described, for example, in EP 887379, EP 887380, EP 887381, and EP 991684. Furthermore, as described herein, between slurry phase polymerization and gas phase polymerization, hydrogen is vented from the polymerization medium in an amount of at least 80 percent.

Gas Phase Polymerization Reactor—Fluidized Bed Reactors

As described above, the subject methods include a second stage of gas phase polymerization. In any embodiment, the second stage can include carrying out the polypropylene homopolymerization reaction to produce a second polypropylene homopolymer in the presence of the first polypropylene homopolymer to produce the polypropylene composition having a molecular weight distribution (Mw/Mn) of at least 10 and an Mz of at least 100,000 grams/mole and comprising a high molecular weight tail in the amount of between 1.0 wt % to 10.0 wt %, such as 2.0 wt. % and 10.0 wt. %. The resulting polypropylene composition (blend) may have a molecular weight distribution between 13 and 15.

In any embodiment, antistatic agents can be introduced into the gas phase polymerization reactor if needed. Suitable antistatic agents and methods to use them are disclosed, for example, in U.S. Pat. Nos. 5,026,795, 4,803,251, 4,532,311, 4,855,370, and EP560035. Antistatic agents can include polar compounds such as water, ketones, aldehydes, alcohols, and the like.

Polypropylene particles generated in a gas phase polymerization reactor can be fluidized with the help of a fluidization gas that includes olefin monomer, comonomer(s), inert gas, and the like. As shown in the FIGS. 1, 2 and 3, the polymerization medium is introduced into an inlet chamber at the bottom of the gas phase polymerization reactor. In any embodiment, gas phase polymerization reactors can contain a fluidized bed that includes growing polyolefin particles containing the active catalyst located above a fluidization grid. To ensure that gas flow is uniformly distributed over the cross-sectional surface area of the inlet chamber, an inlet pipe can be equipped with a flow dividing element as disclosed in, for example, U.S. Pat. No. 4,933,149 and EP 684871.

From the inlet chamber, gas flow within a gas phase polymerization reactor is passed upwards through a fluidization grid into the fluidized bed. The purpose of the fluidization grid is to divide the gas flow evenly through the cross-sectional area of the fluidized bed. In any embodiment, the fluidization grid can be arranged to establish a gas stream to sweep along the reactor walls, as disclosed, for example, in WO 05/087361. Other types of fluidization grids are disclosed, for example, in U.S. Pat. No. 4,578,879, EP 600414, and EP 721798. An overview of fluidization bed reactor function is given in Geldart and Bayens: The Design of Distributors for Gas-fluidized Beds, Powder Technology, Vol. 42, 1985.

When fluidization gas is contacted with the bed containing active catalyst, the reactive components of the gas (i.e., propylene monomers and polypropylene) will react in the presence of the catalyst to produce the second polypropylene homopolymer. Fluidized gas is primarily heated via the exothermic reaction.

Unreacted fluidization gas can be removed from the top of the reactor and cooled in a heat exchanger to remove the heat of reaction. Unreacted fluidized gas is cooled to a temperature which is lower than that of the bed to prevent the bed from heating because of the reaction. It is possible to cool the gas to a temperature where a part of it condenses. When the liquid droplets enter the reaction, they are vaporized. Vaporization heat contributes to the removal of the reaction heat. This kind of operation is called condensed mode and variations of it are disclosed, for example, in WO2007/025640, U.S. Pat. No. 4,543,399, EP699213, and WO94/25495. In any embodiment, condensing agents can be added to a recycle gas stream, as disclosed in EP696293. The condensing agents can include non-polymerizable components, such as n-pentane, isopentane, n-butane or isobutane, and the like.

Figure 2:
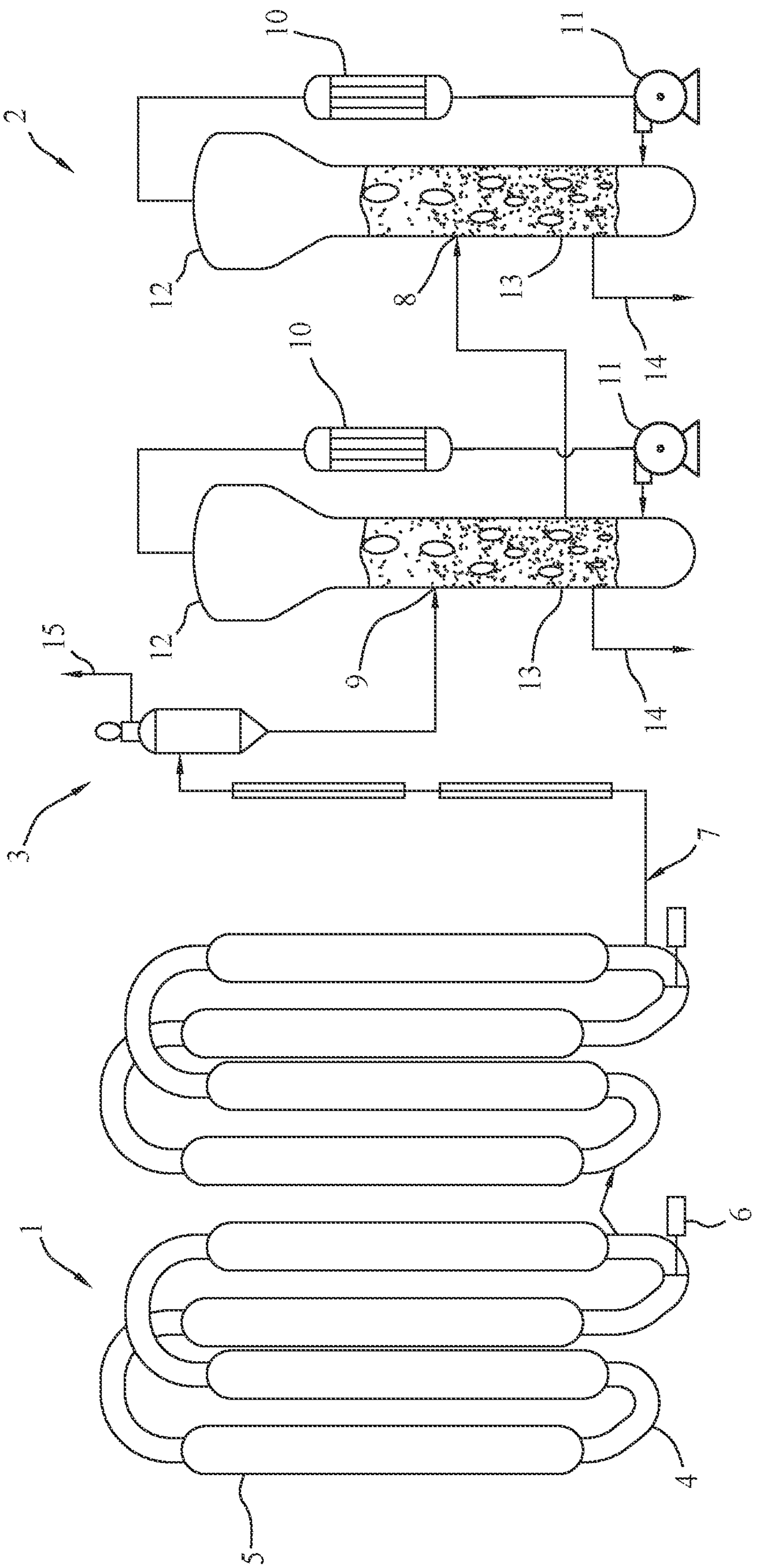
FIG. 2 is a schematic diagram of a multi-stage polymerization process with two gas phase reactors for producing polypropylene compositions having a high molecular weight tail.
Figure 3:
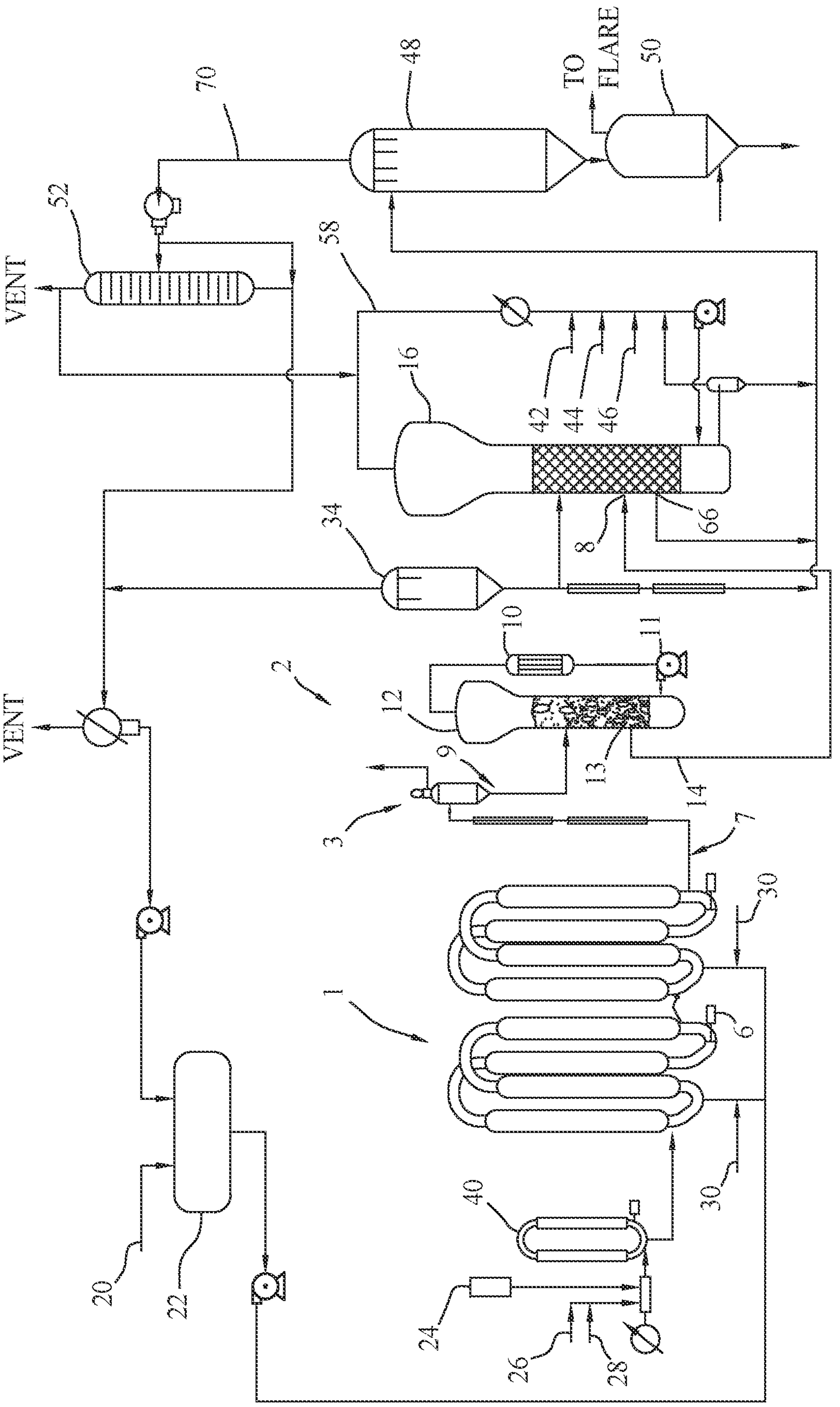
FIG. 3 is a schematic diagram of a multi-stage polymerization process with a pre-polymerization reactor for producing polypropylene compositions having a high molecular weight tail.

Following recovery from a heat exchanger, as shown in FIGS. 1, 2 and 3, unreacted fluidized gas can be compressed and recycled into the inlet chamber of the reactor. Prior to the entry into a gas phase polymerization reactor, fresh reactants can be introduced into the fluidization gas stream to compensate for the losses caused by the reaction and product withdrawal. The composition of the fluidization gas can be analyzed and used to determine whether additional gas components should be added to maintain the desired reaction conditions.

Catalyst systems can be introduced into the reactor in various ways, either continuously or intermittently, as discussed, for example, in WO 01/05845 and EP 499759. Where the gas phase polymerization reactor is a part of a reactor cascade, catalysts can be dispersed within the polypropylene particles from a preceding polymerization stage. Polypropylene particles can be introduced into the gas phase polymerization reactor as disclosed in EP 1415999 and WO 00/26258. For example, if a preceding reactor is a slurry reactor, the slurry reactor effluent can be fed directly to the fluidized bed of the gas phase polymerization reactor as disclosed amongst others in EP 887379, EP 887380, EP 887381, and EP 991684.

Polypropylene can be withdrawn from the gas phase polymerization reactor either continuously or intermittently. Combinations of these methods can also be used. By way of example, continuous withdrawal is disclosed in WO 00/29452 and intermittent withdrawal is disclosed in U.S. Pat. No. 4,621,952, EP 188125, EP 250169 and EP 579426.

More specifically, the gas phase polymerization reactor can further include a disengagement zone in which the diameter of the reactor is increased to reduce the gas velocity and allow the particles that are carried from the bed with the fluidization gas to settle back to the bed. Further, level of the fluidized bed in the gas polymerization reactor can be observed by different techniques. For instance, the pressure difference between the bottom of the reactor and a specific height of the bed can be recorded over the whole length of the reactor and the bed level calculated based on the pressure difference values in order to determine a time-averaged level. In any embodiment, the level of the fluidized bed can be monitored by ultrasonic sensors or radioactive sensors. Here, instantaneous levels can be obtained, which can then be averaged over time to obtain a time-averaged bed level. In addition, gas phase polymerization reactors can include a mechanical agitator to facilitate mixing within the fluidized bed. An example of suitable agitator design is given in EP 707513.

Gas phase polymerization can also be conducted in a "fast fluidized bed reactor" in which the velocity of the fluidization gas exceeds the onset velocity of pneumatic transport. Then the whole bed is carried by the fluidization gas. The gas transports the polypropylene particles to a separation device, such as cyclone, where the gas is separated from the polypropylene particles.

Polypropylene is transferred to a subsequent reaction zone, such as a settled bed or a fluidized bed or another fast fluidized bed reactor. The gas, on the other hand, is compressed, cooled and recycled to the bottom of the fast fluidized bed reactor. In any embodiment, the polypropylene is transferred from the riser (operated in fast fluidized mode) into a downcomer (operated as settled bed) and the fluidizing gas is then directed to compression and cooling as described above. The combination of fast fluidized bed and settled bed is disclosed, for example, in WO 97/04015, WO 06/022736 and WO 06/120187.

Gas Phase Polymerization Reactor—Settled Bed

Gas phase polymerization can also be performed in a settled bed. In the settled bed the polypropylene flows downward in a plug flow manner in an environment containing reactive components in gaseous phase. The polypropylene powder is introduced into the bed from the top from where it flows downwards due to gravity. In any embodiment, reactants, such as monomer and comonomers, can be introduced at any point of the reactor. However, where the gas flows upwards its velocity should not exceed the minimum fluidization velocity as otherwise no downward flow of powder would be obtained. A gas buffer can be located at the top of the reactor so that reaction gas from previous polymerization zones contained in the polypropylene powder would be removed to the extent possible.

The temperature of the settled bed can be controlled by adjusting the temperature and ratio of the reactant and/or inert gases introduced into the settled bed zone.

The settled bed polymerization zone can be combined with a fluidized bed polymerization zone or fast fluidized bed reaction zone. Thus, the polypropylene is introduced into the top of the settled bed zone from a fluidized bed zone or a fast-fluidized bed zone. The polypropylene is withdrawn from the bottom of the settled bed polymerization zone and recycled into the fluidized bed polymerization zone or fast fluidized bed polymerization zone. Polymerization in settled bed is disclosed, for example, in EP 1633466, EP 1484343 and WO 97/04015.

FIGS. 1, 2 and 3 are each a schematic diagram depicting various embodiments of the present methodologies as implemented in polymerization processes and various apparatuses. For example, FIG. 1 shows a two-stage polymerization process including a slurry polymerization reactor 1 and a gas phase polymerization reactor 2. In a first stage, a polypropylene homopolymerization reaction is carried out in the presence of a catalyst system comprising a Ziegler-Nata catalyst and a first external electron donor under a polymerization temperature of between 60° C. and 80° C. to produce a first polypropylene homopolymer having a molecular weight distribution between 6.5 to 8.5. In a second stage, the polypropylene homopolymerization reaction is carried out to produce a second polypropylene homopolymer in the presence of the first polypropylene homopolymer to produce the polypropylene composition having a molecular weight distribution (Mw/Mn) of at least 10 and an Mz of at least 100,000 grams/mole and comprising a high molecular weight tail in the amount of between 2.0 wt. % and 10.0 wt. %, the polypropylene composition having a molecular weight distribution between 13 and 15. Between the first stage and the second stage, hydrogen is vented from the first polypropylene homopolymer. In any embodiment, in gas phase polymerization, the molar ratio of hydrogen to $\alpha$-olefin monomer is between 0 to 0.5, 0.02 to 0.3, 0.05 to 0.3, or 0 to 0.01. In any embodiment, residence times in the slurry polymerization reactor can be between 30 minutes to 120 minutes, 40 minutes to 100 minutes, or 40 minutes to 70 minutes. In any embodiment, residence times in the gas phase polymerization reactors can be between 30 minutes to 240 minutes, 50 minutes to 200 minutes, or 80 minutes to 150 minutes.

As shown in FIG. 1, the slurry polymerization reactor 1 is fluidically connected to the gas phase polymerization reactor 2. In any embodiment and as shown, the slurry polymerization reactor is a slurry loop reactor. Also as shown, each loop 4 can have a heat removal jacket 5. In the slurry polymerization reactor 1, propylene monomer is contacted with catalyst in hydrogen to produce an effluent 7 comprising a first polypropylene homopolymer, hydrogen, propylene monomer and catalyst system. The effluent 7 is continuously fed to the gas phase polymerization reactor 2. Further, liquid propylene monomer (i.e., pure propylene) or propylene monomer in solution (i.e., propylene with a diluent) together with polymerization catalyst and hydrogen are cycled through the slurry polymerization reactor 1 with at least one slurry polymerization reactor pump 6.

Hydrogen is vented from the effluent 7 after the slurry polymerization reactor 1 and before the gas phase polymerization reactor 2. In any embodiment and as shown in FIGS. 1 & 2, hydrogen and unreacted propylene monomer are separated from the effluent 7 through a separator 3. In any embodiment, the effluent 7 is fluidically connected to a separator 3. In the separator 3, the effluent 7 separates into a light component stream 15 containing a mixture of unreacted monomer and hydrogen, and a heavy component stream 9 comprising the first polypropylene homopolymer and catalyst system. In any embodiment, propylene monomer can be fed to gas phase polymerization reactor 2, including unreacted propylene monomer recycled from the separator 3.

Following separation, as shown in FIG. 1, the first polypropylene homopolymer and catalyst system are fed to the inlet 9 of the gas phase polymerization reactor 2. As depicted in FIGS. 1, 2 and 3, in any embodiment, the gas phase polymerization reactor 2 is a vertical, cylindrical fluidized bed reactor having an expansion zone 12 above a fluidized bed 13. In the gas phase polymerization reactor 2, during polymerization, a polymerization medium flows into expansion zone 12. Optionally, a recycle stream taken from the top of the gas phase polymerization reactor is fluidically connected to a cooler 10 and fed to the gas phase polymerization reactor via a compressor 11. Following polymerization, polypropylene can be discharged from the gas phase polymerization reactor outlet 14.

FIG. 3 is another schematic of a polymerization process implementing the present methodologies. With reference to FIG. 3, a polypropylene monomer feed 20 from a feed tank 22 is fed to the slurry polymerization reactor with a circulating flow of propylene and polymerization medium therein driven by pumps. Alternatively, this polypropylene monomer and polymerization medium are fed into a pre-polymerization reactor 40 via feed line 24, the catalyst system via an external donor feed line 26, and the activator via feed line 28. Hydrogen, to a chain terminating agent, is injected into the slurry polymerization reactor(s) at a reactor input 30. The polymerization medium can comprise hydrogen in an amount of between 500 mppm to 10,000 mppm based on the amount of polypropylene monomer feed, but below a bubble point of the system.

As described herein, the first polypropylene homopolymer is continuously drawn from the slurry polymerization reactor 1 and separated from propylene monomer. The propylene monomer can recycle to a tank 22. A transfer line dryer (not shown) can heat the recycle to a temperature to effect vaporization of the polypropylene (and any optional solvent), but low enough to maintain the integrity of the polypropylene therein, such as to keep the polypropylene from becoming sticky and thus fouling the lines, such as a temperature within a range from 50° C. to 120° C., or 140° C.

In any embodiment, as shown in FIG. 3, the first polypropylene homopolymer can be fed to the second gas phase polymerization reactor 16 through line 64 as shown in FIG. 3 forming a second polypropylene homopolymer and the polypropylene composition. To form the second polypropylene homopolymer and the polypropylene composition, polypropylene from the second separator 34 can be fed to the second gas phase polymerization reactor 16 fluidly connected to gas phase polymerization reactor 2. Hydrogen and additional (if necessary) propylene are fed through lines 42 and 46. In any embodiment, operating temperatures for gas phase polymerization can be between 60° C. to 100° C., 60° C. to 90° C., or 65° C. to 85° C. In any embodiment, operating pressure for gas phase polymerization can be between 150 psig to 350 psig, 180 psig to 300 psig, or 180 psig to 250 psig.

Also, as shown in FIG. 3, propylene monomer removed from the second separator 48 can flow to a distillation apparatus 56 (or other separation device) to separate propylene and/or other olefins as necessary. The distillation apparatus 46 can be vented or recycled to the second gas phase polymerization reactor 16, or through recycled to the feed tank 22 as shown.

Noteworthily, certain process details provided in FIGS. 1, 2 and 3, such as the compressors and pumps, are for illustrative purposes only and the apparatus and/or the process is not limited by the type of compressors and pumps used to facility and maintain flow of the polymerization medium, monomers, and separated polyolefins and gas.

In any embodiment, the titanium catalyst can be present in a reactor at 0.005 to 0.5 millimole, or 0.01 to 0.5 millimole, based on Ti moles per liter of the reaction zone. In any embodiment, the organoaluminum co-catalyst can be present in an amount sufficient to produce 1 to 2,000 moles, or 5 to 500 moles of aluminum per mole of the titanium atom in the catalyst system. In any embodiment, the internal electron donor can be present at 0.2 to 5.0, or 0.5 to 2.0 per mole of Ti.

In any embodiment, the total amount of the external electron donors can be 0.001 to 50 moles, or 0.01 to 20 moles, or 0.05 to 10 mole Si per mole of Ti present.

In any embodiment, the external electron donor can be present in a catalyst system at from 2.5 to 50 mol %, or 2.5 to 10 mol % of the total amount of external electron donor present.

Impact Copolymer Configuration

In another configuration, the process can be used to make propylene-based impact copolymers ("ICP") having a high molecular weight tail component. The term "propylene-based impact copolymer" refers a polymer having an α-olefin-propylene copolymer (rubber phase) dispersed in a continuous phase of polypropylene (crystalline phase). Also, the term "crystalline phase" refers to a phase of a polymer in which the polymer chains are arranged in ordered crystals. The terms "rubber phase" and "amorphous phase" can be used interchangeably and are taken to mean a phase of a polymer in which the polymer chains are not arranged in ordered crystals.

For example, the ICPs made by the process herein, preferably ethylene-propylene copolymer in a continuous phase of polypropylene, can be produced by any means of olefin polymerization. Most preferably, a single catalyst is used such as a Ziegler-Natta polymerization catalyst (hereinafter may be referred to as "polymerization catalyst" or simply "catalyst") with one or more activators and/or external electron donors in a slurry polymerization reactor, preferably two external donors whose overall concentration can be varied, and/or varied with respect to one another, as discussed previously. A second reactor, preferably a gas phase reactor may produce the polypropylene having the high molecular weight tail component as already discussed. A third reactor(s), preferably a single gas phase reactor (GPR), is used to produce the ethylene-propylene copolymer portion of the ICP.

In any embodiment is also disclosed a propylene-based impact copolymer comprising within the range from 5, or 8 wt % to 20, or 25, or 30 wt %, or 35 wt % of an ethylene-propylene copolymer, by weight of the propylene-based impact copolymer, imbedded in a continuous phase of polypropylene. In any embodiment, the ethylene-propylene copolymer comprises within the range from 25, or 30, or 35 wt % to 40, or 45, or 50, or 55 wt % ethylene-derived units (or other C4 to C10 α-olefin, but most preferably ethylene) by weight of the ethylene-propylene copolymer. Most preferably, the propylene-based impact copolymer is made by a process described herein. The inventive ICP's tend to comprise an ethylene-propylene copolymer component with a high viscosity, high molecular weight, and a large amount of high molecular weight component, while the polypropylene portion of the ICP tends to have low molecular weight and a high MFR.

In any embodiment, the ICP's have an MFR of at least 0.5, or 1, or 3, or 8, or 15, or 20, or 30, or 60, or 80, or 100 g/10 min, or within a range from 0.5, or 1, or 3, or 8, or 15, or 20, or 30, or 60, or 80, or 100 g/10 min g/10 min to 130, or 140, or 160, or 180, or 200 or 300 g/10 min. In any embodiment, the ICP's described herein have an Mw/Mn within a range from 10, or 12, or 14 to 20, or 24, or 26, or 30. Also in any embodiment the ICP's have an z-average molecular weight (Mz) value of greater than 2800, or 3000, or 3200 kg/mole, or within a range from 2800, or 3000, or 3200 kg/mole to 3600, or 3800, or 4000, or 4200 kg/mole In any embodiment, the ICP's described herein have a ratio of $Mw_{(EP)}/Mw_{(PP)}$ of greater than 5, or 6, or 10, or within a range from 5, or 6, or 10 to 14, or 16, or 20.

In any embodiment the ethylene-propylene copolymer portion of the ICP has an Mw/Mn within a range from 6, or 8, or 10 to 14, or 16, or 20. Also in any embodiment the ethylene-propylene copolymer has an Mz value of greater than 3000, or 3200, or 3400 kg/mole, or within a range from 3000, or 3200, or 3400 kg/mole to 3800, or 4000, or 4200, or 4400 kg/mole. In any embodiment, the ethylene-propylene copolymer has an Mz/Mw value of less than 4, or 3.5, or 3, or within a range from 2.2, or 2.4 to 3, or 3.5, or 4, or 5. Finally, in any embodiment the ethylene-propylene copolymer has an intrinsic viscosity (IV) within a range from 3, or 4 dL/g to 7, or 8, or 10 dL/g.

Also, in any embodiment, the ethylene-propylene copolymer portion of the ICP has a glass transition temperature within a range from −30, or 40, or −45° C. to −55, or −60, or −65° C. as measured by DSC according to ISO 6721-7 at a compression molded sample consisting of the ethylene-propylene copolymer fraction as isolated by, for instance, xylene extraction using a soxhlet extractor.

The inventive ICP's typically have a Rockwell hardness within a range from 95, or 95 to 105 or 110 or 120. The inventive ICP's also typically have a heat deflection temperature (HDT) (0.45 MPa) within a range from 90, or 100, or 110° C. to 120, or 130, or 140° C.; and within a range from 50, or 55° C. to 70, or 75, or 80° C. (1.8 MPa).

In any embodiment, the propylene-based impact copolymers have a flexural modulus of at least 1600, or 1660, or 1700 MPa, or within a range from 1600, or 1660, or 1700 MPa to 1800, or 1840, or 1880, or 1900, or 1940, or 2000 MPa. In any embodiment, the propylene-based impact copolymers also have a notched Izod impact strength of at least 3, or 3.2, or 3.6, or 4, or 4.2, or 4.6 $kJ/m^2$, or within a range from 3, or 3.2, or 3.6, or 4, or 4.2, or 4.6 $kJ/m^2$ to 5.2, or 5.4, or 5.6, or 5.8, or 6, or 6.2 $kJ/m^2$.

Desirable polymers used to blend with the ICP include propylene-based elastomers, plastomers, EPDM, ethylene-propylene rubber, polyethylenes (LLDPE, HDPE, LDPE), homopolypropylene, styrenic block copolymers, hydrocarbon resins, cyclic-olefin copolymers, polyacrylates, polyesters, butyl rubber, polyisobutylene, and polyisoprene. Such blends may be used in desirable articles of manufacture.

The ICP's described herein are suitable for use in processes such as injection molding, blow molding and thermoforming for making useful articles for automotives and appliances, as the relatively high MFR provides for ease of processing, while the desirable physical properties are maintained. In particular, the inventive ICP's can be formed into automotive components, either alone or in a mixture with other polymers, exemplary components can include the interior dashboard, interior side trim, handles, interior door facing and components, exterior bumpers, wheel trim, and various fascia used for decorative purposes.

Random Copolymer Configuration

In another configuration, can be used to make propylene random copolymers (RCP) having a high molecular weight tail component. The term "propylene random copolymer" refers to a propylene polymer having repeating units of a different α-olefin monomer(s) present in a random or statistical distribution in the polymer chain.

For example, the RCPs made by the process herein, can be made by the addition of ethylene or other alpha-olefin into one or more of the reactions described herein. In any embodiment, ethylene or a different alpha-olefin may be introduced into the slurry polymerization reactor in addition to the aforementioned components. Also, in any embodiment, ethylene or a different alpha-olefin may be introduced into the second reactor, preferably a gas phase reactor, that is used to make the polypropylene having the high molecular weight tail component as already discussed.

Additives

Polypropylene compositions can include one or more additives introduced before or during one or more polymerization stages. Additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In any embodiment, polypropylene compositions according to any of the embodiments disclosed herein further can include greater than or equal to 0.01 wt. % of one or more fillers; antioxidants; anti-cling agents; tackifiers; UV stabilizers; heat stabilizers; anti-blocking agents; release agents; anti-static agents; pigments; colorants; dyes; waxes; silica; talc; or a combination thereof Polypropylene Compositions Produced by the Present Process—Physical Properties In any embodiment, polypropylene compositions produced by the present methods can have a melt flow rate at 230° C., 2.16 kg, as calculated according to ASTM 1238, between 0.1 g/10 min. to 500 g/10 min., 10 g/10 min to 400 g/10 min, 20 g/10 min. to 300 g/10 min, or 0.5 g/10 min to 100 g/10 min.

In any embodiment, polypropylene compositions produced by the present methods can have a Notched Izod impact according to ASTM D256 at 21° C. between 0 J/m to 10 J/m, 0 J/m to 6 J/m, or 1 J/m to 6 J/m. In any embodiment, polypropylene compositions produced by the present methods can have a Notched Izod impact according to ASTM D256 at 21° C. between 0.25 ft-lbs/in to 15 ft-lbs/in, and 0.3 ft-lbs/in to 12 ft-lbs/in.

In any embodiment, polypropylene compositions produced by the methods described herein can have a weight average molecular weight as measured by GPC-DRI between 20 kDa to 2,000 kDa, 20 kDa to 1,000 kDa, or 20 kDa to 500 kDa. In any embodiment, polypropylene produced with the present methods can have a molecular weight distribution, or ratio of weight average molecular weight to number average molecular weight (WM.), as measured by GPC-DRI, between 3 to 40, 2 to 30, or 5 to 20.

Polypropylene compositions prepared by the instant methods can have a multimodal molecular weight distribution with more than one peak or inflection point, such as a high molecular weight tail. As described herein, multimodal polypropylene produced by the present methods has a high molecular weight tail. In any embodiment, the high molecular weight tail of the polypropylene compositions has a z-average molecular weight as measured by GPC-DRI greater than 100 kDa, greater than 500 kDa, greater than 1,000 kDa, or greater than 2,000 kDa.

Additional features of the inventive methods are described in the following non-limiting examples. As used in the examples, Melt Flow Rate (MFR) was measured as per ASTM D1238, condition L or ISO 1133B at 230° C. and 2.16 kg load using a melt indexer. The "Melt Index", such as for the plastomer in the compositions, is tested similarly at 190° C.

The flexural modulus was measured according to ASTM D790, using a crosshead speed of 1.27 mm/min, and a support span of 50 mm using an Instron machine. The flexural modulus chord was measured as per ISO 178 test method, at a cross-head speed of 2 mm/min and 64 mm support span using an Instron machine.

The tensile strength at yield, elongation at yield and elongation at break were measured as per ASTM D638 or ISO 527, with a crosshead speed of 50 mm/min, using an Instron Machine.

Using gel permeation chromatography, polymer molecular weight (weight-average molecular weight, $M_w$, number-average molecular weight, $M_n$, and z-averaged molecular weight, $M_z$) and molecular weight distribution ($M_w/M_n$) were determined using Size-Exclusion Chromatography ("GPC"). Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 $cm^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC.

The melt strength of a polymer at a particular temperature, e.g., 190° C., can be determined with a Gottfert Rheotens Melt Strength Apparatus (e.g., Gottfert Rheotens 71.97). The measurement is accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 $mm/s^2$, starting from an initial, zero-force calibration velocity of 10 mm/s) until the molten polymer strand breaks. The force in the strand is measured with a balance beam in conjunction with a linear variable displacement transducer. The force required to extend and then break the extrudate is defined as the melt strength. The force is measured in centinewtons (cN). A typical plot of force vs. wheel velocity is known in the art to include a resonate immediately before the strand breaks. In such cases, the plateau force is approximated by the midline between the oscillations.

Example 1

The combination of catalysts which can produce a broad molecular weight distribution, such as a Ziegler-Natta type catalyst with PTES/DCPMS, are shown to produce polypropylene compositions having broad molecular weight distribution and high molecular weight tail. Specifically, as described below Catalyst A demonstrates 20-25% higher stiffness than CL-catalysts and Catalyst D systems. However, the problem presented was a significantly lower Notched Izod impact even though high stiffness Catalyst A with PTES/DCPMS product offers opportunity for part weight reduction (e.g. use lower density filler) and material savings. Significantly higher skin-layer thickness demonstrated by Catalyst A with PTES/DCPMS products can result in increased stiffness, and stiffness increases with increasing skin-layer thickness and skin/core ratio.

Generally, the greater amount of low molecular weight fraction of the Catalyst A with PTES/DCPMS broad molecular weight products results in lower entanglement density in the matrix and a lower notched Izod Impact strength. As described herein, polypropylene compositions that have a combination of higher stiffness along with better retention of toughness and impact strength properties (improved Notched Izod impact strength). This is accomplished by using a catalyst/donor combination that makes a narrower molecular weight (specifically fewer low MW chains that reduce entanglements and impact strength) along with a high molecular weight tail (helps provide higher stiffness) in a separate reactor.

Polypropylene compositions having a high molecular weight tail were made in single slurry phase reactor with Catalyst A with PTES/DCPMS. For Catalyst A with PTES/DCPMS products, the concentration of high molecular weight tail decreases as the melt flow rate of the polypropylene composition increases. For automotive and appliance applications, higher MFRs (e.g. >10) are generally needed to make parts via injection molding.

Figure 4:
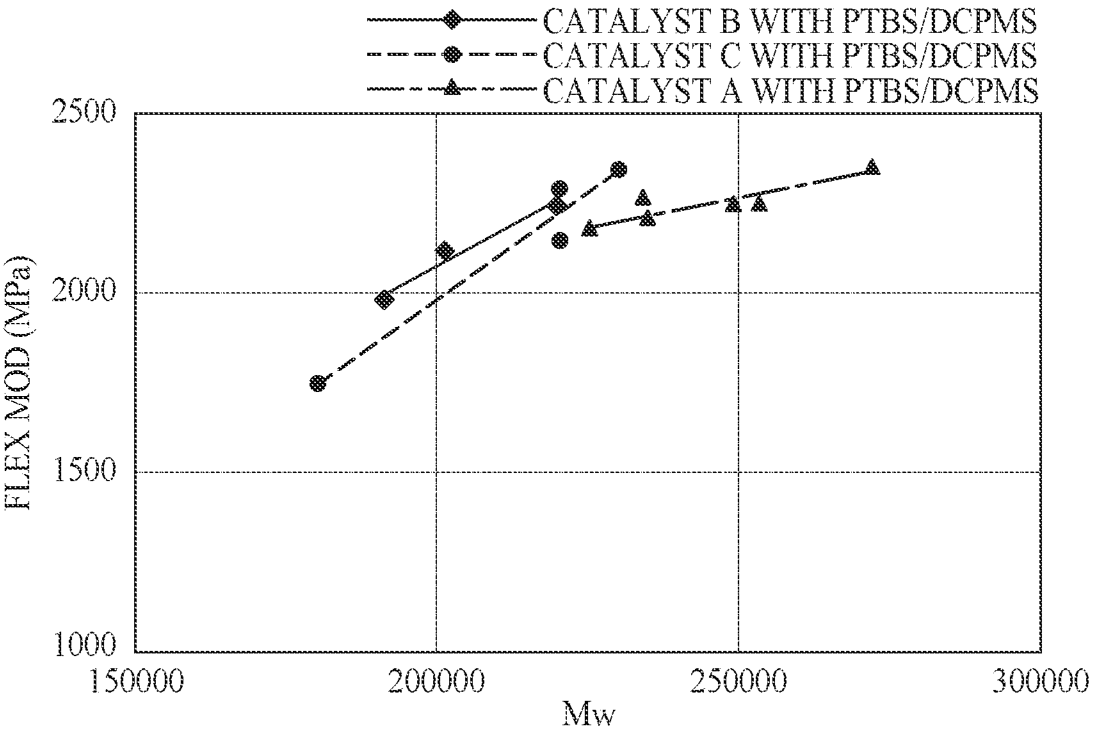
FIG. 4 is a plot comparing the flexural modulus at 0.05 in/min of polypropylene compositions made with three different catalyst systems described herein, and further shows flexural modulus as a function of weight average molecular weight.
Figure 5:
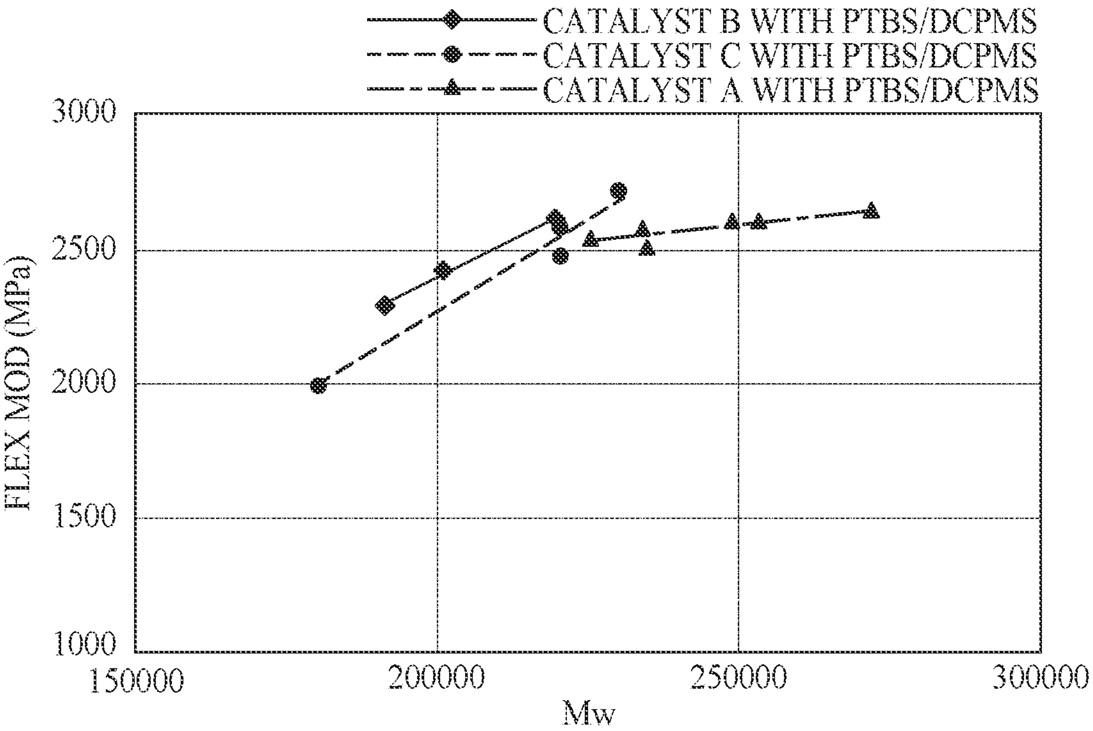
FIG. 5 is a plot comparing the flexural modulus at 0.5 in/min of polypropylene compositions made with three different catalyst systems described herein, and further shows flexural modulus as a function of weight average molecular weight.
Figure 6:
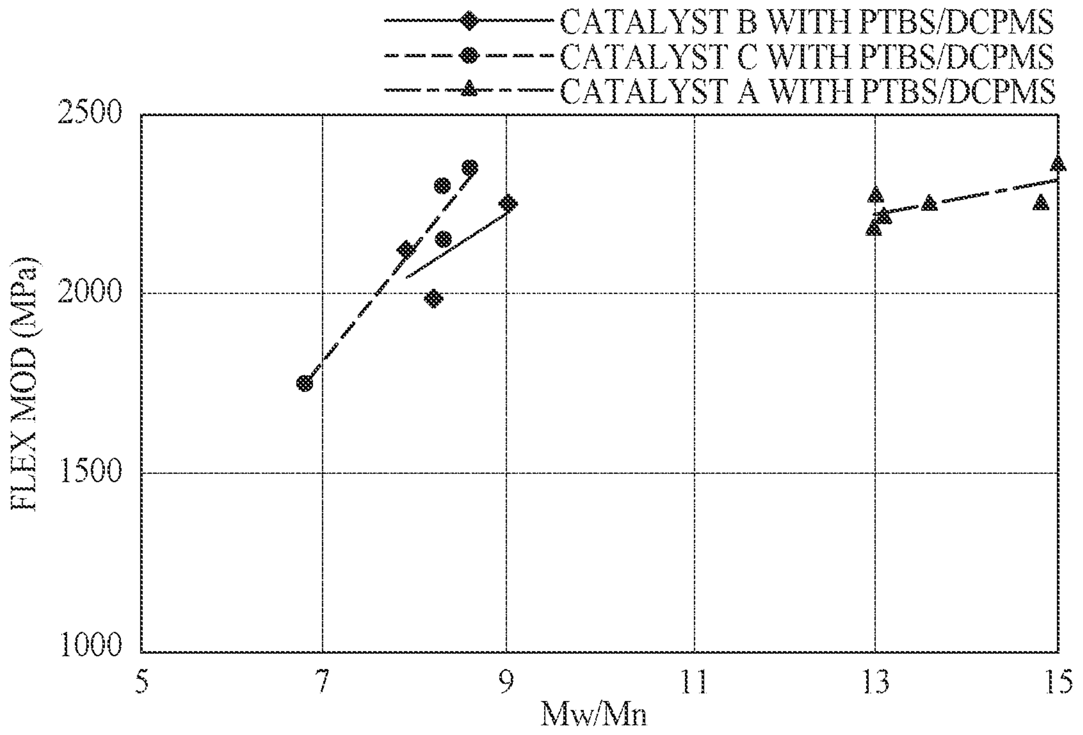
FIG. 6 is a plot comparing the flexural modulus at 0.05 in/min of polypropylene compositions made with three different catalyst systems described herein, and further shows flexural modulus as a function of molecular weight distribution.
Figure 7:
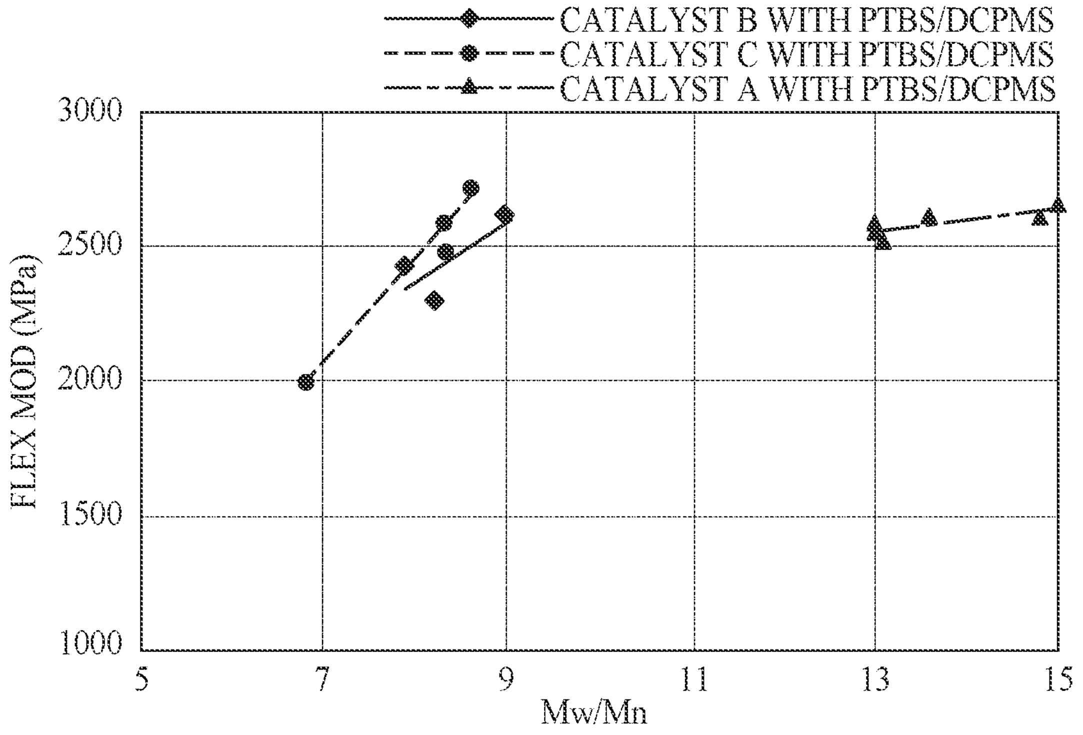
FIG. 7 is a plot comparing the flexural modulus at 0.5 in/min of polypropylene compositions made with three different catalyst systems described herein, and further shows flexural modulus as a function of molecular weight distribution.
Figure 8:
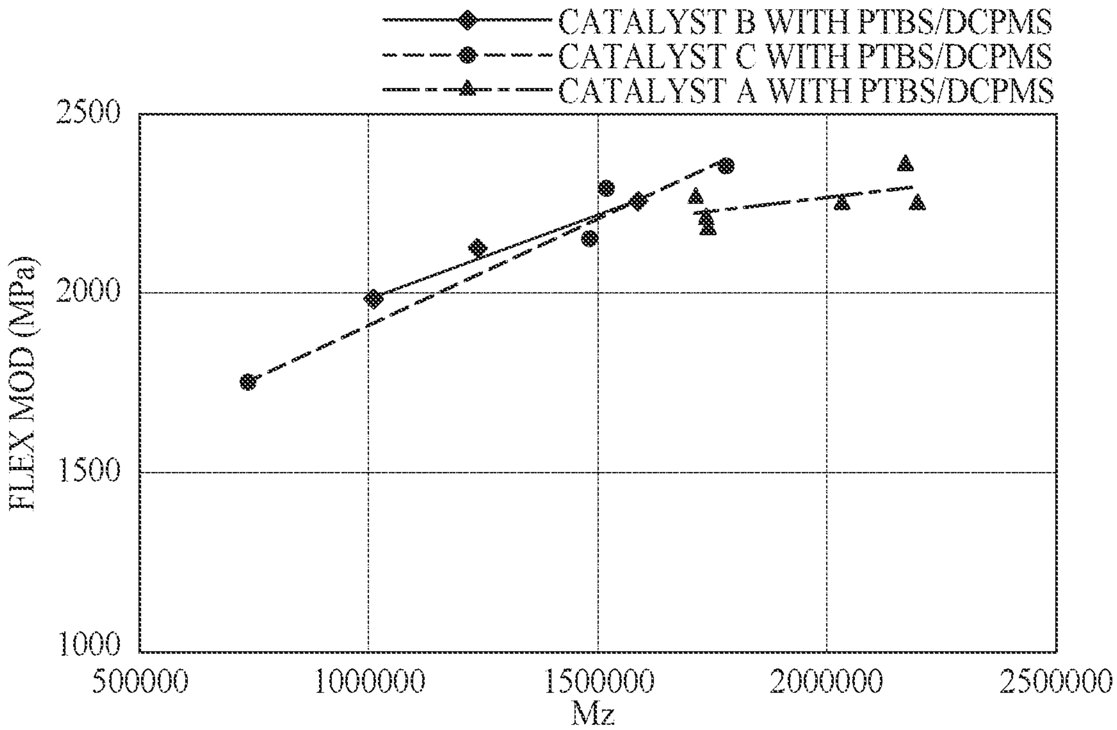
FIG. 8 is a plot comparing the flexural modulus at 0.05 in/min of polypropylene compositions made with three different catalyst systems described herein, and further shows flexural modulus as a function of z-average molecular weight.
Figure 9:
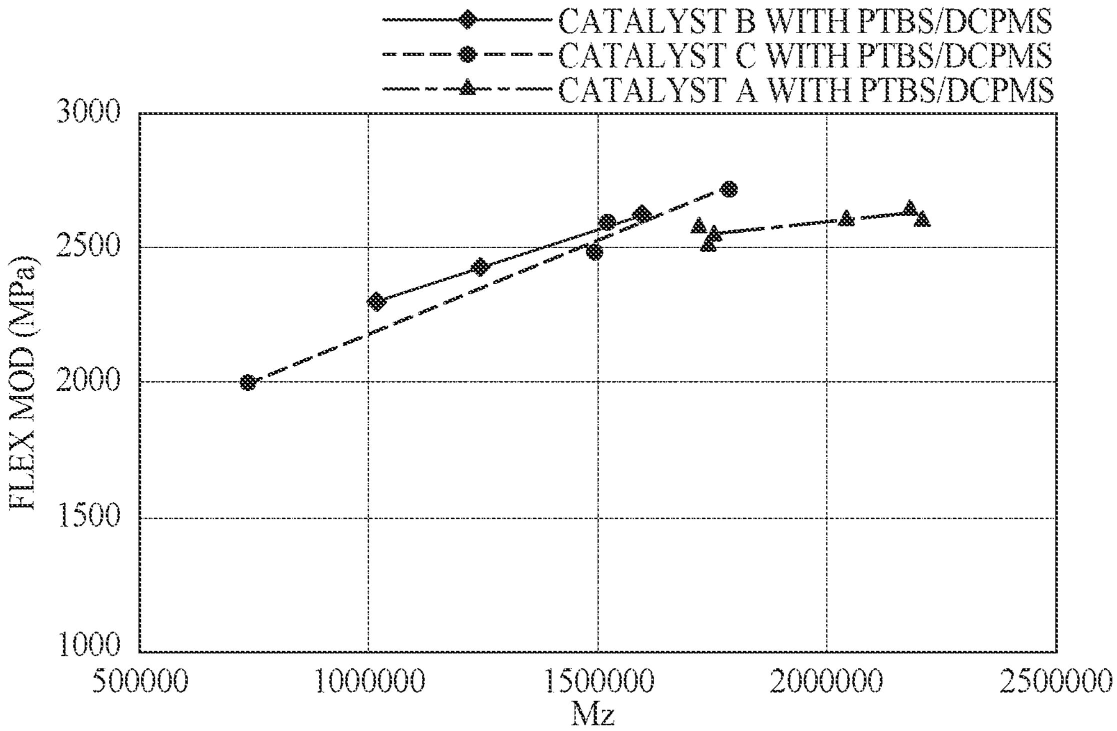
FIG. 9 is a plot comparing the flexural modulus at 0.5 in/min of polypropylene compositions made with three different catalyst systems described herein, and further shows flexural modulus as a function of z-average molecular weight.
Figure 10:
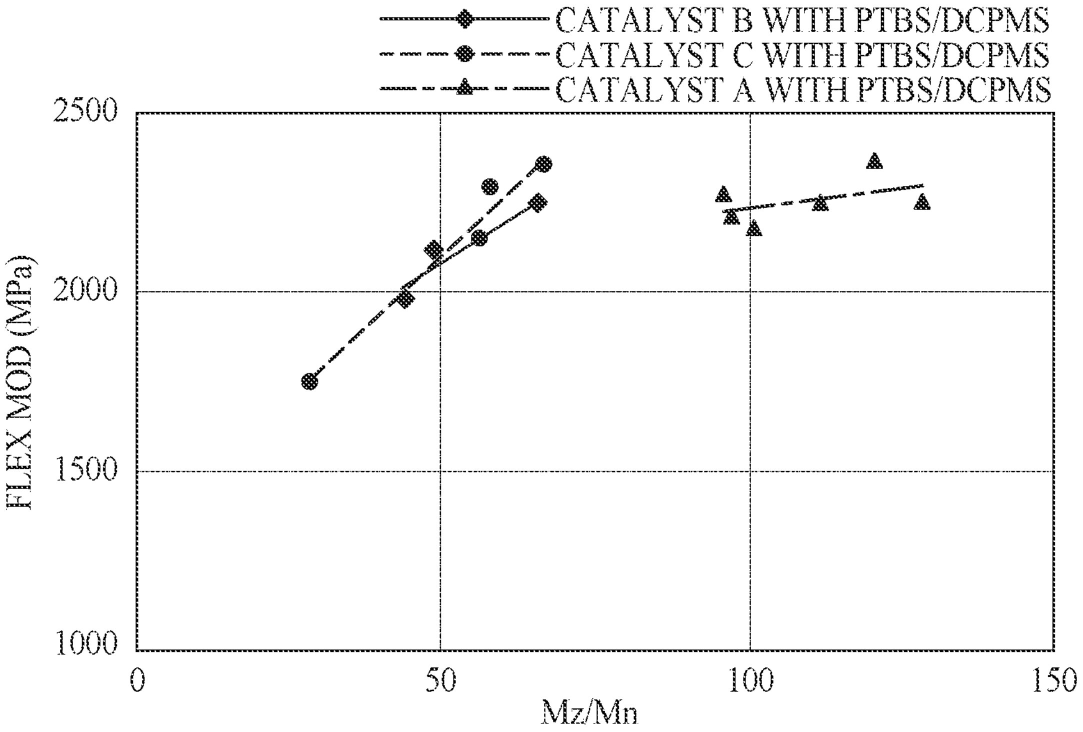
FIG. 10 is a plot comparing the flexural modulus at 0.05 in/min of polypropylene compositions made with three different catalyst systems described herein, and further shows flexural modulus as a function of the ratio of z-average molecular weight to number-average molecular weight.
Figure 11:
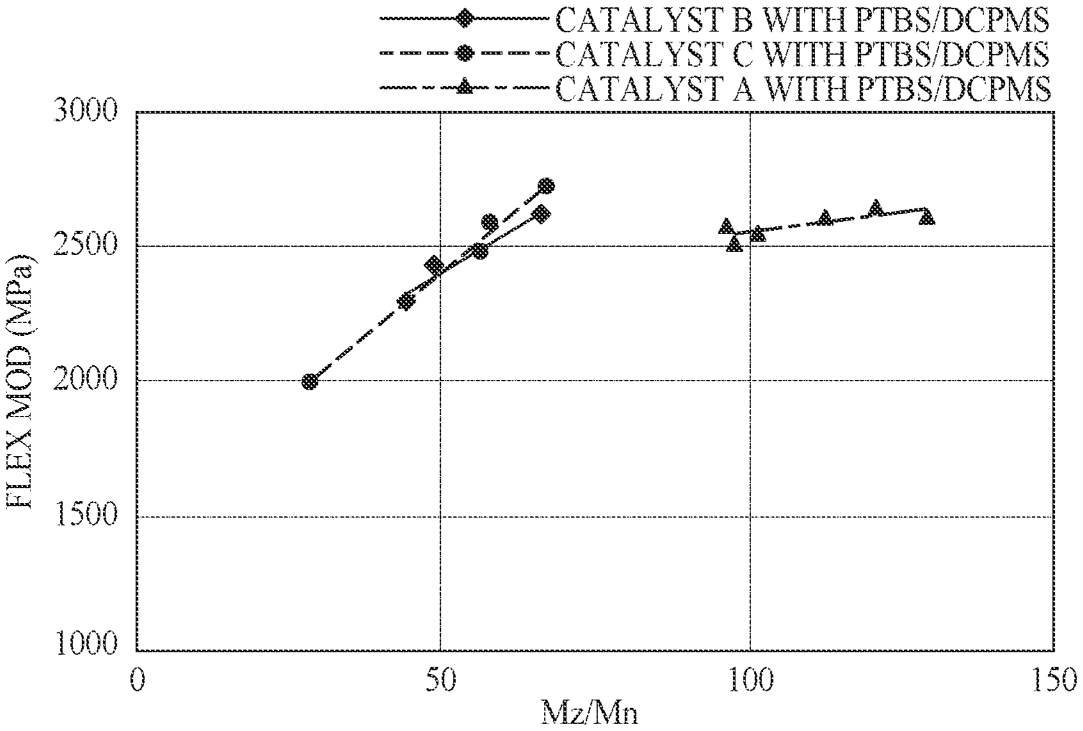
FIG. 11 is a plot comparing the flexural modulus at 0.05 in/min of polypropylene compositions made with three different catalyst systems described herein, and further shows flexural modulus as a function of the ratio of z-average molecular weight to number-average molecular weight.

FIGS. 4 and 5 show molecular weight distributions of several polypropylene compositions having varying melt flow rate. The high molecular weight tail in each of polypropylene compositions is defined as the right-most end of the molecular weight distribution where MWD is between 13 and 15. The polypropylene compositions were generated by adjusting hydrogen amounts in the slurry phase reactor to achieve target MFRs. FIGS. 4 and 5 demonstrate that as melt flow rate (MFR) of the polypropylene composition increased, the molecular weight distribution became narrower and the high molecular weight tail had lower molecular weight.

Table 1 below shows standard deviation and mass fractions of the polypropylene compositions. A target 2-10 wt. % high molecular weight tail concentration was selected based on curve fitting of the polypropylene compositions produced with the Catalyst A and PTES/DCPMS with various MFRs.

TABLE 1

| log(M) | σ | Mass Fraction |
|---|---|---|
| 4.5 | 0.45 | 0.2 |
| 5.25 | 0.44 | 0.54 |
| 5.85 | 0.34 | 0.23 |
| 6.6 | 0.5 | 0.03 |

Table 1 shows that 3 wt. % of the polypropylene composition includes polymer chains having molecular weight such that 5.85≤log(M)≤6.6.

Example 2

The objective was to demonstrate that a high molecular weight polypropylene component made in a series reactor can improve the properties of the polypropylene composition including stiffness, rheology, and melt strength.

In a propylene pilot plant, we targeted the production of polypropylene compositions using various Ziegler-Natta catalysts with PTES/DCPMS as the external electron donor having a melt flow rate of 50 dg/min. The polypropylene homopolymerization reactions were carried out in one slurry phase and two gas phase reactors connected in series. Gas phase reactor bed weights indicate the stages and reactors: 0 indicates a slurry phase in a loop reactor with no additional gas phase, whereas non-zero bed weight values indicate a slurry phase in a loop reactor followed by a gas phase in a gas phase reactor. Following the polypropylene homopolymerization reactions, the polypropylene compositions were extruded with a 30 mm extruder and additives including vitamin E. Table 2 below shows catalysts, bed weights, and MFRs of the polypropylene compositions. The "GPR" is the gas phase reactor bed weight; the "first hPP" is the polypropylene homopolymer from the one or more slurry reactors, and the "combined hPP" is the series reaction product of the first hPP polypropylene and the hPP propylene homopolymer with a high molecular weight tail made from the gas phase reactor. The "Pellet" MFR is the overall MFR of the combined product in pellet form.

TABLE 2

Defining the Conditions

| Catalyst/Donor | Condition # | GPR Bed Weight (lbs) | First hPP MFR (dg/min) | Combined hPP MFR (dg/min) | Pellet MFR (dg/min) |
|---|---|---|---|---|---|
| Catalyst A PTES/DCPMS | 1A | 0 | 46 | 45 | 44 |
| Catalyst A PTES/DCPMS | 1B | 0 | 48 | 45 | 43 |
| Catalyst A PTES/DCPMS | 2A | 80 | 51 | 38 | 31 |
| Catalyst A PTES/DCPMS | 2B | 80 | 65 | 48 | 45 |
| Catalyst A PTES/DCPMS | 3A | 40 | 68 | 60 | 55 |
| Catalyst A PTES/DCPMS | 3B | 40 | 56 | 54 | 42 |
| Catalyst B PTES/DCPMS | 4 | 0 | 53 | 52 | 50 |

TABLE 2-continued

Defining the Conditions

| Catalyst/Donor | Condition # | GPR Bed Weight (lbs) | First hPP MFR (dg/min) | Combined hPP MFR (dg/min) | Pellet MFR (dg/min) |
|---|---|---|---|---|---|
| Catalyst B PTES/DCPMS | 5 | 100 | 64 | 41 | 40 |
| Catalyst B PTES/DCPMS | 6 | 40 | 59 | 47 | 45 |
| Catalyst C PTES/DCPMS | 7 | 0 | 56 | 54 | 50 |
| Catalyst C PTES/DCPMS | 8 | 40 | 60 | 45 | 37 |
| Catalyst C PTES/DCPMS | 9 | 80 | 82 | 46 | 36 |
| Catalyst C PTES/DCPMS | 10 | 80 | 77 | 51 | 40 |
| Catalyst C PTES/DCPMS | 11 | 0 | 46 | 91 | 44 |

As shown in Table 2, polypropylene compositions having a variety of catalyst/donor and gas phase reactor bed weight combinations were made and tested. Polypropylene compositions having a gas phase reactor bed weight of 0 underwent propylene homopolymerization reactions in a single slurry phase reactor with no additional gas phase reaction. The following paragraphs discuss the polypropylene compositions of Table 2, sorted by catalyst. For example, Tables 3A and 3B below shows MFR and molecular weight data for polypropylene compositions made in the presence of the Catalyst C with PTES/DCPMS.

TABLE 3A

| Sample | MFR | Mn | Mw | Mw/Mn | Mz | Mz + 1 | MR (%) |
|---|---|---|---|---|---|---|---|
| Cond 7 | 50 | 26,383 | 180,444 | 6.8 | 736,808 | 2,182,887 | 101.0 |
| Cond 8 | 37 | 26,427 | 220,258 | 8.3 | 1,518,448 | 4,869,027 | 102.3 |
| Cond 9 | 36 | 26,884 | 230,134 | 8.6 | 1,781,152 | 5,301,879 | 100.9 |
| Cond 10 | 40 | 26,667 | 220,393 | 8.3 | 1,484,403 | 4,484,836 | 101.6 |

TABLE 3B

| Sample | Mz/Mn | Mz + 1/Mn | Mz/Mw | Mz + 1/Mw | Wt. % (MW > 1M) |
|---|---|---|---|---|---|
| Cond 7 | 27.9 | 82.7 | 4.1 | 12.1 | 2.10 |
| Cond 8 | 57.5 | 184.2 | 6.9 | 22.1 | 3.25 |
| Cond 9 | 66.3 | 197.2 | 7.7 | 23.0 | 3.59 |
| Cond10 | 55.7 | 168.2 | 6.7 | 20.3 | 3.40 |

Tables 3A and 3B show the molecular weight distributions of polypropylene compositions made in the presence of the Catalyst C with PTES/DCPMS. The polypropylene composition corresponding to Condition 7 underwent a slurry phase but no gas phase. This polypropylene composition achieved the target MFR of 50 dg/min, but displayed a significantly different molecular weight distribution than the polypropylene compositions corresponding to Conditions 8-10, which underwent a polypropylene homopolymerization reaction in a slurry phase in a loop reactor followed by a gas phase in a gas phase reactor. The polypropylene composition corresponding to Condition 7 had a molecular weight distribution of 6.8, narrower than the polypropylene compositions corresponding to Conditions 8-10, which had molecular weight distributions from 8.3 to 8.6. Furthermore, the molecular weight averages ($M_n$, $M_w$, $M_z$, $M_{z+1}$) of the polypropylene composition corresponding to Condition 7 were below that of the polypropylene compositions corresponding to Conditions 8-10. The higher-order molecular weight averages ($M_z$, $M_{z+1}$) were especially discrepant. These higher-order molecular weight averages are particularly sensitive to high molecular weight chains. The discrepancy in $M_z$ and $M_{z+1}$ values therefore indicated higher weight percentages of the high molecular weight tail in the polypropylene compositions corresponding to Conditions 8-10.

Tables 4A and 4B below shows MFR and molecular weight data for polypropylene compositions made in the presence of the Catalyst A with PTES/DCPMS.

TABLE 4A

| Sample | MFR | Mn | Mw | Mw/Mn | Mz | Mz + 1 | MR (%) |
|---|---|---|---|---|---|---|---|
| Cond 1A | 44 | 17,964 | 233,974 | 13 | 1,717,167 | 4,607,835 | 101.8 |
| Cond IB | 43 | 17,920 | 234,826 | 13.1 | 1,737,782 | 4,648,826 | 98.9 |
| Cond 2A | 31 | 18,098 | 271,827 | 15 | 2,172,682 | 5,224,790 | 102.1 |
| Cond 2B | 45 | 17,186 | 253,446 | 14.8 | 2,199,584 | 5,623,784 | 99.1 |
| Cond 3A | 55 | 17,357 | 225,374 | 13 | 1,745,367 | 4,518,190 | 97.9 |
| Cond 3B | 42 | 18,286 | 248,916 | 13.6 | 2,036,447 | 5,266,906 | 98.5 |

TABLE 4B

| Sample | Mz/Mn | Mz + 1/Mn | Mz/Mw | Mz + 1/Mw | Wt. % (MW > 1M) |
|---|---|---|---|---|---|
| Cond 1A | 95.6 | 256.5 | 7.3 | 19.7 | 4.30 |
| Cond IB | 97.0 | 259.4 | 7.4 | 19.8 | 4.29 |
| Cond 2A | 120.1 | 288.7 | 8.0 | 19.2 | 5.34 |
| Cond 2B | 128.0 | 327.2 | 8.7 | 22.2 | 4.81 |
| Cond 3A | 100.6 | 260.3 | 7.7 | 20.0 | 4.10 |
| Cond 3B | 111.4 | 288.0 | 8.2 | 21.2 | 4.68 |

Tables 4A & 4B depict the molecular weight distributions of polypropylene compositions made in the presence of the Catalyst A with PTES/DCPMS. As with the polypropylene compositions made in the presence of the Catalyst C with PTES/DCPMS, the polypropylene compositions made without a gas phase (Condition 1, Boxes 1 and 2) generally showed narrower molecular weight distributions and lower molecular weight averages, particularly higher-order molecular weight averages.

Additionally, the polypropylene compositions made in the presence of the Catalyst A with PTES/DCPMS demonstrated significantly broader molecular weight distributions and higher molecular weight averages, especially $M_z$ and $M_{z+1}$, than the polypropylene compositions made in the presence of the Catalyst C with PTES/DCPMS.

Tables 5A & 5B show MFR and molecular weight data for polypropylene compositions made in the presence of the Catalyst B with PTES/DCPMS.

TABLE 5

| Sample | MFR | Mn | Mw | Mw/Mn | Mz | Mz + 1 | MR (%) |
|---|---|---|---|---|---|---|---|
| Cond 4 | 50 | 23,250 | 191,340 | 8.2 | 1,013,364 | 3,298,230 | 95.3 |
| Cond 5 | 40 | 24,315 | 219,721 | 9 | 1,591,191 | 4,786,006 | 101.9 |
| Cond 6 | 45 | 25,592 | 201,337 | 7.9 | 1,238,904 | 4,127,094 | 100.4 |

TABLE 5B

| Sample | Mz/Mn | Mz + 1/Mn | Mz/Mw | Mz + 1/Mw | Wt. % (MW > 1M) |
|---|---|---|---|---|---|
| Cond 4 | 43.6 | 141.9 | 5.3 | 17.2 | 2.59 |
| Cond 5 | 65.4 | 196.8 | 7.2 | 21.8 | 3.35 |
| Cond 6 | 48.4 | 161.3 | 6.2 | 20.5 | 2.79 |

Tables 5A & 5B depict the molecular weight distributions of polypropylene compositions having a high molecular weight tail made in the presence of the Catalyst C with PTES/DCPMS. Here the polypropylene composition made without a gas phase (Condition 4) displayed similar molecular weight distribution to the other polypropylene compositions, but again had significantly lower $M_z$ and $M_{z+1}$ value. The polypropylene compositions made in the presence of the Catalyst B with PTES/DCPMS had molecular weight distributions and $M_z$ and $M_{z+1}$ value comparable to the polypropylene compositions made in the presence of the Catalyst C with PTES/DCPMS.

These polypropylene compositions were further tested for stiffness. Specifically, the flexural modulus of each polypropylene composition was measured, both at 0.05 in/min and at 0.5 in/min. FIGS. 6, 7, 8, 9, 10, 11, 12 and 13 show flex modulus as a function of molecular weight averages and ratios of molecular weight averages. Table 6 provides stiffness data.

TABLE 6

| Catalyst/Donor | Condition # | GPR Bed Weight (lbs) | Combined hPP MFR (dg/min) | Flex Mod @ 0.05 in/min (MPa) | Flex Mod @ 0.5 in/min (MPa) |
|---|---|---|---|---|---|
| Catalyst A PTES/DCPMS | 1A | 0 | 45 | 2270 | 2580 |
| Catalyst A PTES/DCPMS | 1B | 0 | 45 | 2210 | 2520 |
| Catalyst A PTES/DCPMS | 2A | 80 | 38 | 2360 | 2650 |
| Catalyst A PTES/DCPMS | 2B | 80 | 48 | 2250 | 2610 |
| Catalyst A PTES/DCPMS | 3A | 40 | 60 | 2180 | 2550 |
| Catalyst A PTES/DCPMS | 3B | 40 | 54 | 2250 | 2610 |
| Catalyst B PTES/DCPMS | 4 | 0 | 52 | 1980 | 2300 |
| Catalyst B PTES/DCPMS | 5 | 100 | 41 | 2250 | 2620 |
| Catalyst B PTES/DCPMS | 6 | 40 | 47 | 2120 | 2430 |
| Catalyst C PTES/DCPMS | 7 | 0 | 54 | 1750 | 2000 |
| Catalyst C PTES/DCPMS | 8 | 40 | 45 | 2290 | 2590 |
| Catalyst C PTES/DCPMS | 9 | 80 | 46 | 2350 | 2720 |
| Catalyst C PTES/DCPMS | 10 | 80 | 51 | 2150 | 2480 |
| Catalyst C PTES/DCPMS | 11 | 0 | 91 | 1890 | 2160 |

As shown in FIG. 4 through FIG. 11, flexural modulus increases as molecular weight averages increased and as ratios of $M_w$ and $M_z$ to $M_n$ increase and that heavier polypropylene compositions have higher stiffness. Furthermore, stiffness can be enhanced via selective polymerization of high molecular weight chains. In other words, increasing the amount of the high molecular weight tail achieved higher stiffness.

As further shown in FIG. 4 through FIG. 11, the polypropylene compositions each had similar stiffness. Despite the higher molecular weight averages and ratios of $M_w$ and $M_z$ to $M_n$ of the polypropylene compositions made in the presence of the Catalyst A with PTES/DCPMS, the polypropylene compositions had a flexural modulus comparable to the polypropylene compositions made in the presence of either the Catalyst B or the Catalyst C. The flex modulus of the polypropylene compositions made in the presence of the Catalyst A with PTES/DCPMS seemed to be less affected by molecular weight averages and ratios of $M_w$ and $M_z$ to $M_n$ than the other polypropylene compositions.

Example 3

In this example, six (6) samples of the polypropylene compositions made in Example 2 were submitted for morphology analysis by optical microscopy. Images (not shown) were taken using transmitted polarized light. 1.75 μm-thick cross-sections of each polypropylene composition were cut in a cryomicrotome at −45 and −60° C. Table 7 below shows average skin layer thickness for each polypropylene composition.

TABLE 7

| Sample # | Description | Average Skin Layer Thickness (μm) | Std Dev (μm) |
|---|---|---|---|
| 1 | Cond 1 Box 1-50 MFR PP-Catalyst A with PTES/DCPMS | 421 | 3 |
| 2 | Cond 2B-50 MFR PP w/ High MW Comp-Catalyst A with PTES/DCPMS | 409 | 3 |
| 3 | Cond 4-50 MFR PP-Catalyst B with PTES/DCPMS | 301 | 2 |
| 4 | Cond 5-50 MFR PP w/ High MW Comp-Catalyst B with PTES/DCPMS | 419 | 6 |
| 5 | Cond 7-50 MFR PP-Catalyst C with PTES/DCPMS | 152 | 4 |
| 6 | Cond 9-50 MFR PP w/ High MW Comp-Catalyst C with PTES/DCPMS | 411 | 7 |

A skin layer boundary was defined as a location where the morphology of the polypropylene composition becomes discontinuous. The exact location of the boundary for each polypropylene composition was estimated visually. Measurements from each image were made to determine the average skin layer thickness.

For each of the three catalysts, the sample of polypropylene composition was produced in a slurry phase/loop reactor followed by a gas phase reactor, and another sample of polypropylene composition was produced in a slurry phase/loop reactor without a gas phase reactor. As provided in Table 7, polypropylene compositions produced in both loop and gas phase reactors provided an average skin layer thickness of 410 μm.

Example 4

The objective was to demonstrate that a high molecular weight polypropylene component made in a series reactor can improve the properties of the impact copolymer composition including stiffness and rheology.

In a propylene pilot plant, we targeted the production of polypropylene compositions using various Ziegler-Natta catalysts (Catalysts D, E and F) with Triethoxy (diethylamino)silane as the external electron donor. The polypropylene homopolymerization reactions were carried out in a slurry phase and a gas phase reactors connected in series. Gas phase reactor bed weights indicate the stages and reactors: 0 indicates a slurry phase in a loop reactor with no additional gas phase, whereas non-zero bed weight values indicate a slurry phase in a loop reactor followed by a gas phase in a gas phase reactor. Following the polypropylene homopolymerization reactions, the polypropylene compositions were extruded with a 30 mm extruder and additives including antioxidants such as vitamin E and acid scavengers. Table 8 below shows catalysts, bed weights, and MFRs of the polypropylene compositions. The "GPR" is the gas phase reactor bed weight; the "first hPP" is the polypropylene homopolymer from the one or more slurry reactors, and the "combined hPP" is the series reaction product of the first hPP polypropylene and the hPP propylene homopolymer with a high molecular weight tail made from the gas phase reactor. The "Pellet" MFR is the overall MFR of the combined product in pellet form.

TABLE 8

Defining the Conditions

| Catalyst | Condition | GPR Bed Weight (lbs) | First hPP MFR (dg/min) | Combined hPP MFR (dg/min) | Pellet MFR (dg/min) |
|---|---|---|---|---|---|
| Catalyst D | 15-1 | 0 | 221 | 184 | 178 |
| Catalyst D | 15-2 | 100 | 181 | 113 | 119 |
| Catalyst D | 15-3 | 100 | 290 | 171 | 143 |
| Catalyst E | 15-9 | 0 | 228 | 212 | 183 |
| Catalyst E | 15-10 | 100 | 215 | 93 | 104 |
| Catalyst E | 15-11 | 100 | 386 | 192 | 168 |
| Catalyst F | 15-22 | 0 | 298.3 | 262.7 | 224 |
| Catalyst F | 15-22a | 100 | 237.6 | 132.2 | 108 |

As shown in Table 8, polypropylene compositions having a variety of catalyst/donor and gas phase reactor bed weight combinations were made and tested. Polypropylene compositions having a gas phase reactor bed weight of 0 underwent propylene homopolymerization reactions in a single slurry phase reactor with no additional gas phase reaction. The following paragraphs discuss the polypropylene compositions of Table 8.

TABLE 10A

| Sample | MFR | Mn | Mw | Mw/Mn | Mz | Mz + 1 | MR (%) |
|---|---|---|---|---|---|---|---|
| 15-1 | 178 | 23781 | 121868 | 5.1 | 438607 | 1425553 | 97.8 |
| 15-2 | 119 | 24617 | 152976 | 6.2 | 1309938 | 5375481 | 98.5 |
| 15-3 | 143 | 22494 | 150839 | 6.7 | 1481723 | 5444941 | 98.4 |
| 15-9 | 183 | 21653 | 125221 | 5.8 | 515006 | 1728584 | 98.1 |
| 15-10 | 104 | 21990 | 177843 | 8.1 | 1857300 | 5868031 | 97.5 |
| 15-11 | 168 | 19642 | 149395 | 7.6 | 1687378 | 5600252 | 100 |
| 15-22 | 224 | 20866 | 116939 | 5.6 | 427811 | 1189894 | 97.4 |
| 15-22a | 108 | 22742 | 168018 | 7.4 | 1632895 | 5754045 | 100.8 |

TABLE 10B

| Sample | Mz/Mn | Mz + 1/Mn | Mz/Mw | Mz + 1/Mw | Wt. % (MW > 1M) |
|---|---|---|---|---|---|
| 15-1 | 18.4 | 59.9 | 3.6 | 11.7 | 0.7 |
| 15-2 | 53.2 | 218.4 | 8.6 | 35.1 | 1.5 |
| 15-3 | 65.9 | 242.1 | 9.8 | 36.1 | 1.7 |
| 15-9 | 23.8 | 79.8 | 4.1 | 13.8 | 0.8 |
| 15-10 | 84.5 | 266.8 | 10.4 | 33.0 | 2.1 |
| 15-11 | 85.9 | 285.1 | 11.3 | 37.5 | 1.8 |

TABLE 10B-continued

| Sample | Mz/Mn | Mz + 1/Mn | Mz/Mw | Mz + 1/Mw | Wt. % (MW > 1M) |
|---|---|---|---|---|---|
| 15-22 | 20.5 | 57.0 | 3.7 | 10.2 | 0.7 |
| 15-22a | 71.8 | 253.0 | 9.7 | 34.2 | 1.8 |

Tables 10A and 10B show the molecular weight distributions of polypropylene compositions. The polypropylene composition corresponding to Condition 15-1, 15-9 and 15-22 underwent a slurry phase but no gas phase. This polypropylene compositions displayed significantly different molecular weight distribution than the polypropylene compositions corresponding to the polymer compositions that underwent a polypropylene homopolymerization reaction in a slurry phase in a loop reactor followed by a gas phase in a gas phase reactor. Furthermore, the molecular weight averages ($M_n$, $M_w$, $M_z$, $M_{z+1}$) of the polypropylene composition corresponding to Conditions 15-1, 15-9 and 15-22 were below that of the polypropylene compositions corresponding to the Conditions with the same catalyst where the polymer compositions were carried out in in a slurry phase in a loop reactor followed by a gas phase in a gas phase reactor. The higher-order molecular weight averages ($M_z$, $M_{z+1}$) were especially discrepant. These higher-order molecular weight averages are particularly sensitive to high molecular weight chains. The discrepancy in $M_z$ and $M_{z+1}$ values therefore indicated higher weight percentages of the high molecular weight tail in the polypropylene compositions corresponding to Conditions 15-2, 15-3, 15-10, 15-11, and 15-22a.

Impact copolymers were made from each sample of polypropylene, by formulating each sample with different loadings of ethylene-propylene rubber having an intrinsic viscosity of 2 dL/g and an ethylene content of 56 wt % at low (8.5 wt %), medium (18.5 wt %) and high (27 wt %) loadings, based on total weight of the impact copolymer. Each impact copolymer is shown in Table 11 along with its MFR and flexural modulus.

TABLE 11

| Catalyst | Condition # | GPR Bed Weight (lbs) | % EPR (wt %) | ICP MFR (dg/min) | Flex Mod @ 0.05 in/min (MPa) |
|---|---|---|---|---|---|
| Catalyst D | 15-1 | 0 | 8.5 | 125 | 1650 |
| Catalyst D | 15-1 | 0 | 18.5 | 90 | 1410 |
| Catalyst D | 15-1 | 0 | 27 | 68 | 1220 |
| Catalyst D | 15-3 | 100 | 8.5 | 111 | 2090 |
| Catalyst D | 15-3 | 100 | 18.5 | 84 | 1970 |
| Catalyst D | 15-3 | 100 | 27 | 67 | 1680 |
| Catalyst E | 15-9 | 0 | 8.5 | 132 | 1580 |
| Catalyst E | 15-9 | 0 | 18.5 | 94 | 1350 |
| Catalyst E | 15-9 | 0 | 27 | 72 | 1260 |
| Catalyst E | 15-10 | 100 | 8.5 | 119 | 2120 |
| Catalyst E | 15-10 | 100 | 18.5 | 97 | 2030 |
| Catalyst E | 15-10 | 100 | 27 | 81 | 1730 |
| Catalyst F/U | 15-22 | 0 | 8.5 | 180 | 1860 |
| Catalyst F | 15-22 | 0 | 18.5 | 116 | 1480 |
| Catalyst F | 15-22 | 0 | 27 | 82 | 1260 |
| Catalyst F | 15-22a | 100 | 8.5 | 77 | 2260 |
| Catalyst F | 15-22a | 100 | 18.5 | 62 | 1950 |
| Catalyst F | 15-22a | 100 | 27 | 57 | 1710 |

As shown in Table 11, flexural modulus increases for impact copolymers with the same ethylene-propylene loading as polypropylene molecular weight averages for increased and as ratios of $M_w$ and $M_z$ to $M_n$ increase and that heavier polypropylene compositions have higher stiffness.

Example Five

The objective was to demonstrate that a high molecular weight polypropylene component made in a series reactor can improve the properties of the random copolymer composition including stiffness and rheology.

In this example, random copolymers were made with Ziegler Natta catalyst in a 2 L lab scale reactor. A comparative random copolymer was made according to the conditions of Table 12.

TABLE 12

Comparative RCP process conditions

| | | |
|---|---|---|
| catalyst | | Ziegler Natta |
| Ti/Al ratio | | 500 |
| Slurry phase temperature | ° C. | 70 |
| Slurry phase pressure | psig | 430-550 |
| H2 concentration in vapor | ppm | 1000-100,000 |
| ethylene concentration in vapor | % | 0-2 |
| Slurry phase residence time | min | 60 |

In an inventive example, a random copolymer was made by a first stage slurry polymerization followed by a second stage in gas phase polymerization reaction according to the conditions of Table 13.

TABLE 13

Inventive RCP process conditions

| | | |
|---|---|---|
| catalyst | | Ziegler Natta |
| Ti/Al ratio | | 500 |
| Slurry phase temperature | ° C. | 70 |
| Slurry phase pressure | psig | 430-550 |
| H2 concentration in vapor | % | 2-10 |
| ethylene concentration in vapor | % | 0.1-2 |
| Slurry phase residence time | min | 40-100 |
| Gas phase temperature | ° C. | 65-90 |
| Gas phase pressure | psig | 180-300 |
| Gas phase ethylene concentration in vapor | % | minimum |
| Gas phase H2 concentration in vapor | % | minimum |
| Gas phase residence time | min | 10-60 |

Molecular weight characteristics, Flex Mod*, and RTNI for each of the polymers are shown in Table 14. Flex Mod*, as used in this example, was determined according to ASTM D790, using a crosshead speed of 1.27 mm/min, and a support span of 50 mm using an Instron machine. "RTNI" is Notched Izod impact and was measured according to ASTM D256 at 21° C. The ethylene content in each random copolymer is also identified in the Table as "C2 wt %" and is the percent by weight of ethylene in the copolymer as determined by GPC. Random copolymers made from the process conditions of Table 12 are identified as C1-C3. Random copolymers made from the process conditions of Table 13 are identified as E1-E7. As can be seen in the data, stiffness improves in the inventive random copolymers having the high molecular weight tail component.

TABLE 14

| Sample | MFR, g/10 min | Mw | Mw/Mn | Mz | Mz/Mw | C2 wt % | Flex Mod* (1% secant), Mpa | RTNI (ft * lb/in) |
|---|---|---|---|---|---|---|---|---|
| C1 | 73.66 | 161702 | 6.13 | 650149 | 4.02 | 1.2 | 1044.25 | 0.748 |
| C2 | 80.87 | 150171 | 5.91 | 493349 | 3.29 | 1.3 | 1092.94 | 0.767 |
| C3 | 122.81 | 133994 | 5.73 | 470220 | 3.51 | 1.13 | 1103 | 0.686 |
| E1 | 127.08 | 91663 | 7.66 | 617843 | 6.74 | 1.2 | 1238.88 | 0.323 |
| E2 | 142.14 | 87923 | 6.48 | 593609 | 6.75 | 1.32 | 1267.73 | 0.294 |
| E3 | 139 | 142133 | 7.02 | 866320 | 6.10 | 1.3 | 1207.77 | 0.669 |
| E4 | 111.18 | 152536 | 6.87 | 792140 | 5.19 | 1.39 | 1275.54 | 0.696 |
| E5 | 79.41 | 155519 | 6.26 | 661931 | 4.26 | 1.2 | 1212.69 | 0.701 |
| E6 | 55.63 | 187853 | 7.27 | 1078695 | 5.74 | 0.68 | 1402.1 | 0.773 |
| E7 | 57.93 | 197461 | 7.83 | 1342462 | 6.80 | 0.79 | 1334.14 | 0.747 |

It is to be understood that this disclosure is not limited to specific compounds, components, compositions, reactants, reaction conditions, ligands, catalyst structures, metallocene structures, or the like, as such can vary, unless otherwise specified. It is also to be understood that the terminology used herein is for the purpose of describing particular embodiments only and is not intended to be limiting.

All numerical values within the detailed description and the claims can modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited. Additionally, within a range includes every point or individual value between its end points even though not explicitly recited. Thus, every point or individual value can serve as its own lower or upper limit combined with any other point or individual value or any other lower or upper limit, to recite a range not explicitly recited.

We claim:

1. A process for forming a polypropylene composition comprising the steps of making a first propylene-based polymer having a molecular weight distribution between about 3 to about 8.5; and making a second propylene-based polymer in the presence of the first propylene-based polymer to produce the polypropylene composition having an Mz of at least 1,000,000 grams/mole;

wherein the first propylene-based polymer and/or the second propylene-based polymer are made in the presence of a catalyst system comprising a blend of tetraethoxysilane (TEOS) and dicyclopentyldimethoxysilane (DCPMS).

2. The process of claim 1, wherein the first propylene-based polymer is made in the presence of a catalyst system comprising a Ziegler-Natta catalyst and a first external electron donor under a polymerization temperature of between about 60° C. and about 80° C. to produce the first propylene-based polymer.

3. The process of claim 1, wherein the first propylene-based polymer is a homopolymer.

4. The process of claim 1, wherein the polypropylene composition has a Notched Izod impact according to ASTM D256 in a range of 0.25 ft-lbs/in to 15 ft-lbs/in.

5. The process of claim 1, wherein the first propylene-based polymer is made by a slurry phase polymerization in a slurry phase polymerization reactor.

6. The process of claim 1, wherein the second propylene-based polymer is made by a gas phase polymerization in a gas phase polymerization reactor.

7. The process of claim 1, wherein the second propylene-based polymer is made in the presence of a different catalyst system than the first propylene-based polymer.

8. The process of claim 1, wherein the catalyst system comprises two different catalysts.

9. The process of claim 1, wherein the catalyst system comprises a combination of three different catalysts.

10. The process of claim 5, wherein the slurry phase polymerization is performed in the slurry polymerization reactor at a pressure in a range of about 430 psig to about 580 psig.

11. The process of claim 5, wherein the slurry phase polymerization is performed in the slurry polymerization reactor at a temperature in a range of about 60° C. to about 80° C.

12. The process of claim 6, wherein the gas phase polymerization is performed in the gas phase polymerization reactor at a pressure in a range of about 150 psig to about 350 psig.

13. The process of claim 6, wherein the gas phase polymerization is performed in the gas phase polymerization reactor at a temperature in a range of about 60° C. to about 100° C.

14. The process of claim 5, wherein the slurry phase polymerization is performed in the slurry phase polymerization reactor at a residence time in a range of about 30 minutes to about 120 minutes.

15. The process of claim 6, wherein the gas phase polymerization is performed in the gas phase polymerization reactor at a residence time in a range of about 30 minutes to about 240 minutes.

16. The process of claim 1, wherein the polypropylene composition has a flex modulus of greater than about 175 kpsi and a Notched Izod impact greater than 0.3 ft.-lbs./in.

* * * * *